United States Patent
Golowich et al.

(10) Patent No.: US 7,023,533 B2
(45) Date of Patent: Apr. 4, 2006

(54) SYSTEM AND METHOD FOR DETERMINING PROPAGATION CHARACTERISTICS OF PHOTONIC STRUCTURES

(75) Inventors: Steven E. Golowich, Livingston, NJ (US); Michael I. Weinstein, Short Hill, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 299 days.

(21) Appl. No.: 10/633,246

(22) Filed: Aug. 1, 2003

(65) Prior Publication Data

US 2005/0024628 A1 Feb. 3, 2005

(51) Int. Cl.
*G01N 21/00* (2006.01)
(52) U.S. Cl. ..................................... 356/73.1
(58) Field of Classification Search ............. 356/73.1; 385/123–125, 127, 37, 11
See application file for complete search history.

(56) References Cited

U.S. PATENT DOCUMENTS 6,788,865 B1 * 9/2004 Kawanishi et al. ......... 385/125
6,859,598 B1 * 2/2005 Hasegawa et al. .......... 385/127

FOREIGN PATENT DOCUMENTS

| WO | WO 00/22466 | 4/2000 |
| WO | WO 00/65386 | 11/2000 |

* cited by examiner

*Primary Examiner*—Tu T. Nguyen

(57) ABSTRACT

Systems for, and method of, determining propagation characteristics of a photonic structure having a transverse N-fold symmetry. In one embodiment, a system includes: (1) a numerical analyzer that employs a leading order of a systematic homogenization expansion having multiple scales to develop an angularly averaged indexed profile for the photonic structure and (2) a leading order corrector, associated with the numerical analyzer, that further employs the homogenization expansion to refine an imaginary part of an effective index of refraction of the photonic structure.

15 Claims, 11 Drawing Sheets

SYSTEM AND METHOD FOR DETERMINING PROPAGATION CHARACTERISTICS OF PHOTONIC STRUCTURES

TECHNICAL FIELD OF THE INVENTION

The technique disclosed herein is directed, in general, to photonic structures (including waveguides) and, more specifically, to a system and method for determining propagation characteristics of such photonic structures.

BACKGROUND OF THE INVENTION

There is currently a great deal of interest in the light propagation characteristics of microstructured, or "holey," optical fiber waveguides with novel cross-sections consisting of holes surrounded by glass. The holes may be empty or filled with a material chosen to influence the propagation. The ability to vary the transverse geometry due to advances in fabrication technology, combined with the large index contrasts possible with such structures, give multiple new degrees of freedom that potentially enable designs radically different than were previously possible with standard fibers.

Numerous interesting phenomena have already been observed in such waveguides. Among them are (i) guiding by the interference-based photonic band gap effect in fibers with an air core and a (truncated) transverse periodic lattice of air holes; (ii) variability of chromatic dispersion with microstructure; and resulting (iii) nonlinear effects in newly accessible spectral ranges due to microstructure-induced shifting zero dispersion point in glass core fibers.

Efficient and accurate mathematical modeling of light propagation characteristics of microstructured fiber is necessary for their design and analysis. A feature of most such structures is that they are inherently leaky due to the existence of paths leading from the core to the cladding that avoid the holes and pass only through the background glass. Such structures support no true guided modes, however, they may have leaky modes characterized by complex-valued propagation constants or effective indexes (scattering resonances); the leakage rate is given by the imaginary part.

Physically, this leakage is due to a combination of tunneling through the holes and propagating through the glass surrounding them. The ability to calculate such rates is clearly of fundamental importance. Other quantities of interest include the real parts of the effective indexes, which determine the response of the structure to longitudinal variations such as gratings, and the dispersion relations of the various leaky modes, which may be quite unusual compared to standard waveguides, due to the presence of large index contrasts and interference effects.

Many numerical studies of microstructure fibers have been undertaken based on direct numerical calculation of static Maxwell's equations in an effort to determine the system's modes. Some of these numerical studies are also able to capture the attenuation rates. A variety of methods have been used, among them: (1) the multiple expansion, which works well for structures with circular holes, (2) more general expansions in local bases and Fourier decompositions, which are applicable to more general geometries and (3) scalar and vector beam propagation, which are applicable to general geometries but have limitations in computing very small attenuation rates and have proven problematic in some more complex geometries.

All of these techniques have the characteristic that the computational difficulty of the calculations increases with the complexity of the structures. Accordingly, this creates a potentially intractable issue with today's proposed fiber structures.

Accordingly, new systems and methods are needed in the art for mathematically modeling complex photonic structures that are more accurate, flexible, computationally tractable and free of the constraints prior-art methods. Such new systems and methods will allow the propagation characteristics of the photonic structures to be analyzed in detail, leading to the discovery of new photonic structures having highly advantageous characteristics.

SUMMARY OF THE INVENTION

To address the above-discussed deficiencies of the prior art, the present invention provides a novel technique for studying microstructures and systems and methods designed around the technique. Systems for, and method of, determining propagation characteristics of a photonic structure having a transverse N-fold symmetry. In one embodiment, a system includes: (1) a numerical analyzer that employs a leading order systematic homogenization expansion having multiple scales to develop an angularly averaged indexed profile for the photonic structure and (2) a principal corrector, associated with the numerical analyzer, that employs details of the photonic structure and the homogenization expansion to obtain effective refractive indices of modes of the photonic structure.

Further, in one embodiment of the present invention, a scalar approximation may be used to obtain accurate values for the real part of the effective indexes of the leaky modes for fine microstructures. For example, a multiple scale perturbation theory of a large class of "sufficiently oscillatory" structures, suitable for the analytical study and efficient numerical computation of such quantities as leakage rates, group velocities and dispersion, that becomes more accurate as the transverse structure becomes more oscillatory may be used.

If the transverse structure is invariant under rotation by $2\pi/N$ (e.g., in the case of a single ring of N holes uniformly distributed in an annulus) the leaky modes can be expanded, as well as the effective indexes (scattering resonances) in powers of $1/N$. The leading order in the expansion turns out to be the averaged or homogenized index profile referred to above. The technique disclosed herein, thus, focuses primarily on the derivation and computation of the leading order corrections (order $N^{-2}$), due to microstructure, or both the real and imaginary parts of the effective indexes of the leaky modes of such averaged profiles. Since the leading order behavior is given by a homogenization (in angle) effective medium, it may be referred to as a homogenization expansion.

In an alternative embodiment, results on first-order corrections to homogenized eigenvalues of periodic composite media may be obtained in a different context.

BRIEF DESCRIPTION OF THE DRAWINGS

For a more complete understanding of the technique disclosed herein, reference is now made to the following descriptions taken in conjunction with the accompanying drawings, in which.

DETAILED DESCRIPTION

Figure 1:
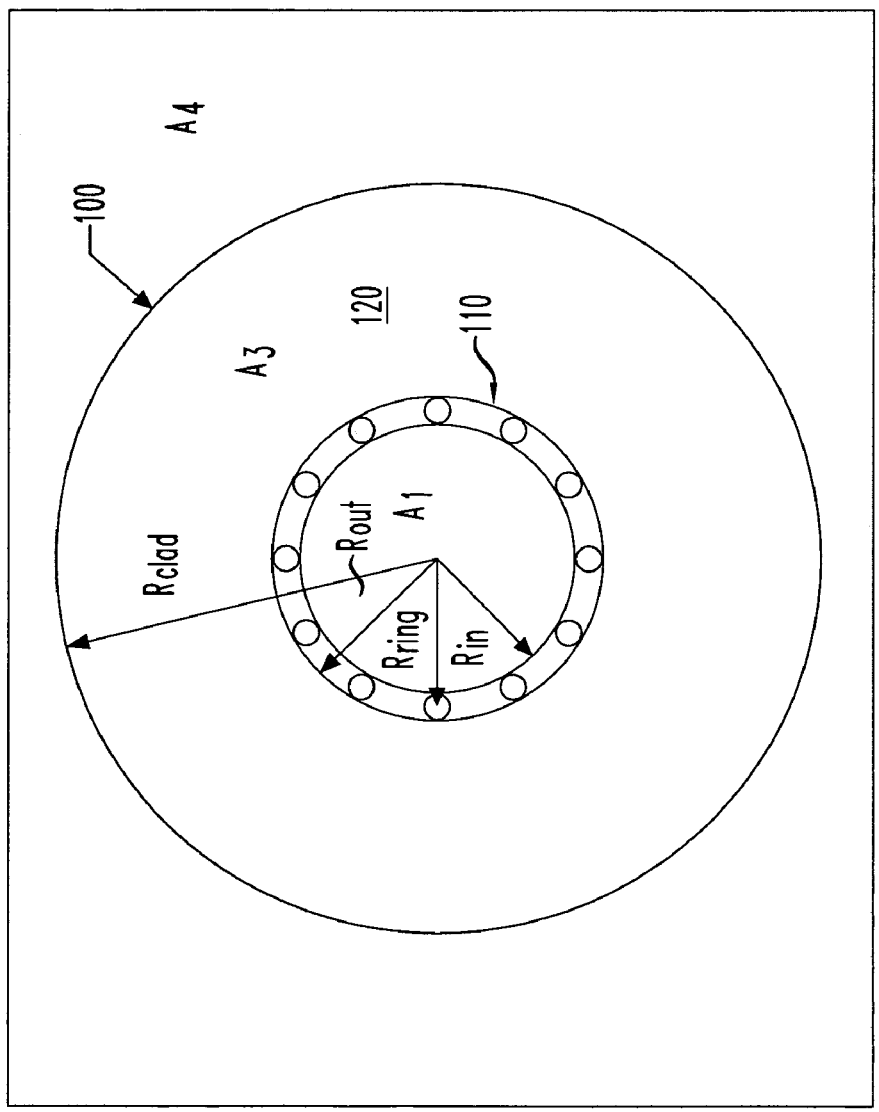
FIG. 1 illustrates a cross-section of a microstructured waveguide.

A few of the consequences of the homogenization expansion and numerical implementation that the technique disclosed herein wishes to highlight include:

(1) Computational algorithm: The analytic theory leads to a natural efficient computational algorithm for the modes and spectral characteristics, e.g., leakage rates and dispersion. Multiscale analysis enables one to eliminate the "stiff" aspects of the computation due to the rapidly varying structure. Therefore, one can expect significant reduction in computational effort. This is especially important for increasingly microstructured media, for which the approximation improves. This, however, is also especially important for simulation-based optimization of light-guiding characteristics.

(2) Arbitrary geometry and index contrasts: Although the technique disclosed herein requires N-fold symmetry of the structure, the individual microfeatures may have arbitrary geometry and large index contrasts. In one implementation of the technique disclosed herein, an arbitrary microfeature is approximated by a simple layered potential, defined below, for which many of the calculations required can be done explicitly.

(3) Very good agreement with full numerical simulation: Results of numerical simulations are presented below based on a theory for several waveguides with transverse microstructure. The technique disclosed herein further focuses on the complex effective indexes as they vary with the geometry of the microstructure. The technique disclosed herein, in one particular embodiment, is particularly interested in the imaginary parts of the effective indexes, which correspond to the leakage rates. The technique disclosed herein may then present comparisons of predicted loss rates, with results obtained by solving the Helmholtz equation directly by Fourier decomposition algorithm and the vector Maxwell equation by multiple methods. One expects a homogenization theory to be valid when the wavelength of light is long compared with the individual microfeatures. The technique disclosed herein finds very good agreement with the theory using full simulations even in regimes where $\lambda_{fs}/d$, the ratio of wavelength to length scale of microfeatures, is as small as 3/2. Although the expansion is derived for N being large, with the N=∞ limit being the leading order term, examples set forth below show agreement in cases where N=3 and N=6. The technique disclosed herein also notices the expected departure of the approximate methods from the results of full simulations for sufficiently small $\lambda_{fs}/d$.

(4) Sensitivity of leakage rates to microstructure: The technique disclosed herein uses a theory to compute the first two nontrivial terms of the effective indexes (scattering resonances) of the leaky modes. The first term corresponds to an average theory and the second term is a correction due to the microstructures. The imaginary parts of the effective indexes, corresponding to the leakage rates, are very sensitive to the introduction of microstructure and their accurate approximation requires both terms. In contrast, as noted above, the real parts of the effective indexes may be relatively insensitive to microstructure, and are well captured by the leading order term.

(5) Corrected fields: Corrections, due to microstructure, of the mode fields predicted by the averaged structure are compactly supported in space if the microstructure perturbation is compactly supported in space. This is typically not possible for the true solution of the mathematical model. An additional observation indicating a limitation of the homogenization expansion is seen for a family of structures consisting of two rings of holes, parameterized by the relative phase angle of the arrangement in one ring to another. Since the variation in refractive index in one ring occurs on a set disjoint from that for the second ring, the homogenization expansion predicts complex effective indexes that are independent of the phase angle. This suggests that in the regime where certain interference effects are important, the expansion technique described herein may have limited use. Nevertheless, a two-term approximate expansion of modes and effective indexes proves valid for sufficiently large N. This rigorous theory gives field corrections which, at any finite N, are not compactly supported.

Mathematically, the leaky modes and effective indexes are obtainable from the solution of the eigenvalue problem for the Schrödinger equation $$(-\Delta_\perp + V(r,\theta,N\theta))\psi = E\psi \quad (1)$$

ψ outgoing as r=|x|→∞

This is formulated as a scattering resonance problem below. Here, $\Delta_\perp$ denotes the two-dimensional Laplace operator in the transverse plane. (When the context is clear, the subscript ⊥ will be omitted.) Since the outgoing radiation condition at infinity is not self-adjoint, one expects the eigenvalues, E, to be complex. The attenuation or leakage rates are given by the imaginary part of $$\beta = \sqrt{k^2 n_g^2 - E} \qquad (2)$$

where $n_g$ denotes a background refractive index. Of importance in optics is the effective index $$n_{\text{eff}} \equiv \frac{\beta}{k} \qquad (3)$$

where $k=2\pi/\lambda_{fs}$, and $\lambda_{fs}$ is the free space wavelength. The effective index is a complex quantity for leaky waveguides. The real and imaginary parts of β, $\Re\beta$ and $\Im\beta$, are displayed in the FIGUREs in plots of $$\gamma \equiv 10 \log \frac{\text{Power Input}}{\text{Power Output}} \sim \Im\beta$$

versus $$\Re_{n_{\text{eff}}} = k^{-1} \Re\beta$$

Attenuation rates, γ, are given in units of dB/cm, while $\Re_{n_{\text{eff}}}$ is dimensionless.

The technique disclosed herein, in one aspect, also relates the certain portions of the invention to a rigorous perturbation theory of a general class of scattering resonance problems with rapidly varying and high contrast potentials. In particular, this perturbation theory implies the validity of the homogenization expansion and error estimates for the two-term truncation uses in certain simulations.

Maxwell's Equations in a Waveguide

Consider a waveguide with refractive index profile n(x). If the medium is non-magnetic and there are no sources of free charge or current, then Maxwell's equations imply that the transverse components of the electric field obey $$(\Delta_\perp + k^2 n^2(x_\perp) - \beta^2)\vec{e}_\perp = \vec{v}_1 \vec{e}_\perp, \qquad (4)$$

where $$\vec{v}_1 \vec{e}_\perp = -\nabla_\perp (\vec{e}_\perp \cdot \nabla_\perp \ln n^2).$$

In one embodiment, the technique disclosed herein works in the scalar approximation, which entails neglecting the term $\vec{v}_1 \vec{e}_\perp$ in equation (4) that arises due to the vector nature of the fields. For modes that are localized away from the microstructure, which includes most of the examples given below, the vector corrections are expected to be small because the field $\vec{e}_\perp$ is small at the interfaces, which are the only places at which it contributes. However, this will not be true in other examples of interest, and one skilled in the art would expect that the methods can be extended to the full vector case. In any case, vector effects will not be discussed any further.

In the scalar approximation the components of $\vec{e}_\perp$ satisfy independent scalar Helmholtz equations. For purposes of the technique disclosed herein, φ denotes either of these transverse components. Then, $$(\Delta_\perp + k^2 n^2)\phi = \beta^2 \phi \qquad (5)$$

where $\Delta_\perp$ denotes the Laplace operator in the transverse variables, $x_\perp = (x_1, x_2)$. Introducing the notation:

$$V = k^2(n_g^2 - n^2), \quad E = k^2 n_g^2 - \beta^2 \qquad (6)$$

the equation for the φ and propagation constant β can be viewed as a Schrödinger equation with potential $V(x_\perp)$ and energy parameter E:

$$L\phi \equiv (-\Delta_\perp + V)\phi = E\phi. \qquad (7)$$

Corresponding to the physical problem described below, it can be assumed that for some $r_* > 0$, $$V(x) \geq 0, \text{ for all } x \text{ and}$$

$$V(x) = 0, \text{ for } |x| \geq r_*. \qquad (8)$$

The potential, V, therefore does not support bound states (guided modes) and only has scattering states (radiation modes), along with scattering resonances (leaky modes).

The Resonance Problem for Microstructure Waveguides

Now, consider a cylindrical waveguide composed of two materials "g" and "h", with corresponding refractive indexes $n_g$ and $n_h$. One can specify a transverse cross-section of the waveguide in the 2-dimensional plane, with coordinates $x=(x,y)=(r,\theta)$. In FIG. 1, shown is a schematic picture of a glass waveguide 100 with a single ring of 12 air holes 110 in a solid glass cylinder 120. Four regions are illustrated: $A_1$ the region $|x| \leq R_{in}$, a disc of glass with refractive index $n_g$; $A_2$, the region $R_{in} \leq |x| \leq R_{out}$, an annular region with 12 equally spaced air-holes; $A_3$; the region $R_{out} \leq |x| \leq R_{clad}$, consisting of a solid glass $n=n_g$, and finally; $A_4$, the region $|x| \geq R_{clad}$, consisting of air, $n=n_h$.

The technique disclosed herein, in part, is interested in how well light is confined to the core ($A_1$) region in such microstructure fiber. This structure has actual guided, in addition to leaky, modes, due to the lower refractive index of region $A_4$. However, the propagation of light from $A_1$ to $A_3$ may be considered as loss. Therefore, the appropriate mathematical problem for these purposes is the mode equation (7) posed on the spatial domain $\{|x| \leq R_{in}\} \cup \{R_{in} \leq |x| \leq R_{out}\} \cup \{R_{out} \leq |x|\}$ and subject to an outward going radiation condition as $|x| \to \infty$. In practice, the glass optical fiber is usually coated with a high index and high loss polymer, so any light that does leak into $A_3$ is rapidly attenuated, further justifying the use of this boundary condition.

A more general mathematical formulation of the problem is now presented.

The scattering resonance problem: Given a potential (index profile) $V=V(r,\theta)$ of compact support, the technique disclosed herein seeks E and nonzero φ for which $$L\phi \equiv (-\Delta + V)\phi = E\phi \qquad (9)$$

subject to the outward going radiation condition, as $r \to \infty$. The pair (φ,E) may be called a scattering resonance pair. A scattering resonance pair is sometimes also called a quasiresonance.

In this setting, the radiation condition can be simply described. Because V(r) is identically zero for $r \geq r_*$, equation (7) becomes:

$$-(\Delta_\perp + E)\phi = 0, \quad r \geq r_*. \qquad (10)$$

Solutions of equation (10) can be expanded in a series $$\varphi = \sum_{l=-\infty}^{+\infty} \left( c_l^{(1)} e^{il\theta} H_l^{(1)}(\sqrt{Er}) + c_l^{(2)} e^{il\theta} H_l^{(2)}(\sqrt{Er}) \right) \quad (11)$$

where $H_l^{(1)}$ and $H_l^{(2)}$ are first and second Hankel functions of order l. Therefore the requirement that φ be outgoing is equivalent to the vanishing of all coefficients $c_l^{(2)}$, in equation (11):

Outward going radiation $\Re c_l^{(2)} = 0$ for all $l$. (12)

Since equation (11) is a non-self adjoint boundary condition at infinity, E can be expected to be complex. However, there are constraints on the location of E in the complex plane. For the φ to be oscillatory at infinity, $\Re E > 0$, and for φ to be outgoing, $\Re \sqrt{E} > 0$. Furthermore, $\Im E \leq 0$. Also, if $\Im E > 0$ then $\Im \sqrt{E} > 0$. From the series expansion (equation (11)) with $c_l^{(2)} = 0$, it can be concluded that φ exponentially decays as $r \to \infty$ and therefore is an eigenstate of the self-adjoint operator L with a non-real eigenvalue. This yields a contradiction.

Thus, if E is an energy for which a solution of the resonance problem exists, then $\Re E > 0$ and $\Im E \leq 0$. Correspondingly, by (2.3), $\Re \beta > 0$ and $\Im \beta > 0$. Since $\vec{E}(x,\omega) = \vec{e}(x_\perp)e^{i\beta x_3}$, the complex resonances E correspond to the radiative decay or leakage rates of the structure.

Multiple Scales and Homogenization Expansion

A multiple scale expansion of solutions will now be derived to the resonance problem for microstructures, giving a homogenized (averaged) theory at leading order, plus systematically computable corrections. The analysis is carried out for a class of potentials V with the dependence:

$$V = V(r, \theta, N\theta) = V(r, \theta, \Theta) \quad (13)$$

where V is 2□ periodic in □ and □. Thus equation (13) allows both a slow and a fast angular modulation of the index profile. In the special case where V does not depend on □ and $V=V(r,N\theta)$, the potential corresponds to an index profile with an N-fold symmetry. Assume $V \geq 0$ and that for some $r_*$, $V(r)=0$ for $r \geq r_*$. The technique disclosed herein will show the following:

Homogenization Expansion: The resonance mode problem (equations (9) through (12)) has, for large N, solutions with the formal expansion:

$$\varphi(r, \theta, N) = \Theta^{(N)}(r, \theta, \Theta), \Theta = N\theta \quad (14)$$

given by $$\Phi^{(N)} = \Phi + \frac{1}{N^2} \Phi_2 + O\left(\frac{1}{N^3}\right)$$

$$E^{(N)} = E_0 + \frac{1}{N^2} E_2 + O\left(\frac{1}{N^3}\right).$$

Thus, corrections due to microstructure begin at $O(N^{-2})$. $(\Phi_0(r,\theta), E_0)$ is a non-trivial solution of the resonance problem:

$$L_{av}\Phi_0 = E_0 \Phi_0 \quad (15)$$

where $\Phi_0$ is subject to the outward going radiation condition (equation (12)), and the averaged operator is given by:

$$L_{av} \equiv \frac{1}{2\pi} \int_0^{2\pi} L d\Theta \equiv -\Delta_\perp + V_{av}(r, \theta) \quad (16)$$

$\Phi_2 = \Phi_2^{(p)} + \Phi_2^{(h)}$, where $\Phi_2^{(p)}$ is the mean zero solution (easily derived from the, Fourier series of $V(.,.,\Theta)$ of:

$$\frac{1}{\Gamma^2} \partial_\Theta^2 \Phi_2^{(p)} = [V(r, \theta, \Theta) - V_{av}(r, \theta)]\Phi_0(r, \theta) \quad (17)$$

and $(\Phi_2^{(h)}, E_2)$ solves:

$$(L_{av} - E_0)\Phi_2^{(h)} = \quad (18)$$
$$\left( E_2 + \frac{r^2}{2\pi} \int_0^{2\pi} |\partial_\Theta^{-1}[V(r, \theta, \Theta) - V_{av}(r, \theta)]|^2 d\Theta \right) \Phi_0(r, \theta).$$

Finally, $E_2$ is uniquely determined by the condition that (4.6) has a solution that satisfies an outgoing radiation condition at $r=\infty$; see equation (12).

This yields an approximate solution of the scalar wave equation and an approximation (neglecting vector effects) of the transverse electric field, $\vec{E} = (E_\perp, E_{lon}) = (E_1, E_2, E_{35})$, of Maxwell's equations:

$$E_{\perp,q}(x; \beta) \sim e^{i(\beta x_3 - \omega t)}\left[\Phi_0(|x_\perp|, \theta, \omega) + \frac{1}{N_2}\Phi_2(|x_\perp|, \theta, N\theta, \omega) + O\left(\frac{1}{N_3}\right)\right].$$

Here, $q=0$ or $1$, $\omega = ck$, and $\beta = \sqrt{k^2 n_g^2 - E} = \Re\beta + i\Im\beta$, with $\Im\beta > 0$. $E_{\perp,q}(x_\perp, x_3)$ decays with increasing $x_3$ and is therefore a "leaky mode." These modes are not square integrable.

The results of numerical simulations performed using a two-term truncation of the homogenization expansion will be presented and compared with published computations of solutions to the full problem. Further the question of convergence of the expansion is discussed.

A. Multiple Scale Expansion

Due to the rapidly varying coefficient in equation (7), one skilled in the pertinent art would expect rapid variations in its solutions. Therefore, the technique disclosed herein explicitly introduces the fast angular variable:

$$\Theta = N\theta \quad (19)$$

and views φ as a function of the three independent variables: r, θ and Θ:

$$\phi(r,\theta) = \Phi(r,\theta,\Theta). \quad (20)$$

Here, the polar coordinates are $x = (r, \theta)$ and note that $$\Delta_\perp = \Delta_r + \frac{1}{r^2} \partial_\theta^2, \quad (21)$$

where $\Delta_r$ denotes the radial part of the transverse Laplacian:

$$\Delta_r \equiv \partial_r^2 + \frac{1}{r} \partial_r.$$

Thus, the operator $\partial_\theta$ is replaced by $\partial_\theta + N\partial_\Theta$, and equation (7) becomes:

$$\left(-\Delta_r - \frac{1}{r^2}(\partial_\theta + N\partial_\Theta)^2 + V(r, \theta, \Theta)\right)\Phi = E\Phi. \quad (22)$$

Equivalently $$\left(L - \frac{2N}{r^2}\partial_\theta\partial_\Theta - \frac{N^2}{r^2}\partial_\Theta^2\right)\Phi = E\Phi. \quad (23)$$

Seeking an expansion of $\Phi$ and E in the small parameter $1/N$ $$\Phi^{(N)} = \Phi_0 + \frac{1}{N}\Phi_1 + \frac{1}{N^2}\Phi_2 + \frac{1}{N^3}\Phi_3 + \frac{1}{N^4}\Phi_4 + \Phi_5^{(N)} \quad (24)$$

$$E^{(N)} = E_0 + \frac{1}{N}E_1 + \frac{1}{N^2}E_2 + E_3^{(N)}.$$

Here, $\Phi_j = \Phi(r,\theta,\Theta)$.

Substitution of equation (24) into equation (23) and equating like powers of $1/N$, a hierarchy of equations arising at each order in $1/N$ is obtained. The first five equations of this hierarchy are:

$$O(N^2): \frac{1}{r^2}\partial_\Theta^2 \Phi_0 = 0 \quad (25)$$

$$O(N): \frac{1}{r^2}\partial_\Theta^2 \Phi_1 = -\frac{2}{r^2}\partial_\theta \partial_\Theta \Phi_0 \quad (26)$$

$$O(1): \frac{1}{r^2}\partial_\Theta^2 \Phi_2 = -\frac{2}{r^2}\partial_\theta \partial_\Theta \Phi_1 + (L - E_0)\Phi_0 \quad (27)$$

$$O(N^{-1}): \frac{1}{r^2}\partial_\Theta^2 \Phi_3 = -\frac{2}{r^2}\partial_\theta \partial_\Theta \Phi_2 + (L - E_0)\Phi_1 - E_1\Phi_1 \quad (28)$$

$$O(N^{-2}): \frac{1}{r^2}\partial_\Theta^2 \Phi_4 = -\frac{2}{r^2}\partial_\theta \partial_\Theta \Phi_3 + (L - E_0)\Phi_2 - E_1\Phi_1 - E_2\Phi_0. \quad (29)$$

B. Construction of the Multiple Scale Expansion

As is typical in perturbation expansions, a hierarchy of inhomogeneous linear equations, which have a fixed linear operator to invert and varying inhomogeneous term, must be solved. Each member of the hierarchy is of the form:

$$\frac{1}{r^2}\partial_\Theta^2 F = G(r, \theta, \Theta). \quad (30)$$

A necessary and sufficient condition for solvability in the space of $2\pi$-periodic in $\Theta$ functions is:

$$\int_0^{2\pi} G(r, \theta, p)dp = 0. \quad (31)$$

Proceeding with a term-by-term construction of the perturbation expansion:

O($N^2$)Terms:

$$\frac{1}{r^2}\partial_\Theta^2 \Phi_0 = 0 \quad (32)$$

From this it follows that $\Phi_0$ is independent of the fast phase, $\Theta$:

$$\Phi_0(r,\theta,\Theta) = \Phi_0(r,\theta) \quad (33)$$

O(N) Terms:

$$-\frac{2}{r^2}\partial_\theta \partial_\Theta \Phi_0 - \frac{1}{r^2}\partial_\Theta^2 \Phi_1 = 0. \quad (34)$$

Using equation (33) in equation (34)

$$\frac{1}{r^2}\partial_\Theta^2 \Phi_1 = 0 \quad (35)$$

and therefore:

$$\Phi_1(r,\theta,\Theta) = \Phi_1(r,\theta). \quad (36)$$

Using equation (36), the following can be found:

O(1) Terms:

$$\frac{1}{r^2}\partial_\Theta^2 \Phi_2 (L - E_0)\Phi_0. \quad (37)$$

Equation (37) has a solution in the space of $2\pi$-periodic in $\Theta$ functions if and only if the following solvability condition holds:

$$(L_{av} - E_0)\Phi_0 = 0. \quad (38)$$

Here $L_{av}$ and $V_{av}$ denote, respectively, the average operator and potential with respect to the fast angular dependence. They are given by:

$$L_{av} = -\Delta_\perp + V_{av} = -\Delta_r - \frac{1}{r^2}\partial_\theta^2 + V_{av}(r, \theta) \quad (39)$$

$$V_{av}(r, \theta) = \frac{1}{2\pi}\int_0^{2\pi} V(r, \theta, p)dp.$$

Note that $L - L_{av} = V - V_{av}$.

$(\Phi_0(r,\theta), E_0)$ are fixed to be a scattering resonance pair of an outgoing solution and its associated complex eigenvalue.

Since $\Phi_0$ satisfies equation (38), the inhomogeneous equation (37) can be put in the simpler form:

$$\frac{1}{r^2}\partial_\Theta^2 \Phi_2 = [V(r, \theta, \Theta) - V_{av}(r, \theta)]\Phi_0(r, \theta). \quad (40)$$

The solution of equation (40) is expressed in the form $$\Phi_2 = \Phi_2^{(p)}(r\theta,\Theta) + \Phi_2^{(h)}(r,\theta) \quad (41)$$

where $\Phi_2^{(p)}(r,\theta,\Theta)$ and $\Phi_2^{(h)}(r,\theta)$ are, respectively, a particular solution of mean zero and a homogeneous solution of (40), which is to be determined at higher order in $N^{-1}$. That $\Phi_2^{(p)}(r,\theta,\Theta)$ can be chosen to be $2\pi$-periodic in $\Theta$ follows from the mean zero property of $V(r,\theta,\Theta) - V_{av}(r,\theta)$. Also, $\Phi^{2(p)}$ is mean zero in $\Theta$ because the constant term in its Fourier expansion is included in $\Phi_2^{(h)}$. To compute $\Phi_2^{(p)}$, $V(r,\theta,\Theta)-V_{av}(r,\theta)$ is expanded into a Fourier series in $\Theta$:

$$V(r,\theta,\Theta) - V_{av}(r,\theta) = \sum_{|j|\geq 1} \eta_j(r,\theta)e^{ij\Theta}. \quad (42)$$

Resulting in $$\Phi_2^{(p)}(r,\theta,\Theta) = \partial_\Theta^{-2}[V(r,\theta,\Theta) - V_{av}(r,\theta)]r^2\Phi_0(r,\theta) \quad (43)$$

$$= \sum_{|j|\geq 1} (ij)^{-2}\eta_j(r,\theta)e^{ij\Theta}r^2\Phi_0(r,\theta)$$

$O(N^{-1})$ Terms:

$$\frac{1}{r^2}\partial_\Theta^2 \Phi_3 = -\frac{2}{r^2}\partial_\theta\partial_\Theta \Phi_2 + (L-E_0)\Phi_1 - E_1\Phi_0 \quad (44)$$

$$= -\frac{2}{r^2}\partial_\theta\partial_\Theta \Phi_2^{(p)} + (L-E_0)\Phi_1 - E_1\Phi_0$$

The solvability condition becomes $$(L_{av}-E_0)\Phi_1 = E_1\Phi_0 \quad (45)$$

which is satisfied by taking $E_1=0$ and $\Phi_1=0$.

Using the mean zero property of $\Phi_2^{(p)}$, one can see that equation (44) becomes $$\partial_\Theta \Phi_3(r,\theta,\Theta) = -2\partial_\theta \Phi_2^{(p)}(r,\theta,\Theta) \quad (46)$$

$O(N^{-2})$ Terms:

Using that $E_1=0$ and $\Phi_1=0$, as well as equation (46) to solve for $\Phi_3$ in terms of $\Phi_2^{(p)}$, it can be found that this order:

$$\frac{1}{r^2}\partial_\Theta^2 \Phi_4 = \frac{4}{r^2}\partial_\theta^2 \Phi_2^{(p)} + (L-E_0)\Phi_2 - E_2\Phi_0 \quad (47)$$

$$= \left(L - E_0 + \frac{4}{r^2}\partial_\theta^2\right)\Phi_2^{(p)} + (L-E_0)\Phi_2^{(h)} - E_2\Phi_0$$

$$= \left(L_{av} - E_0 + \frac{4}{r^2}\partial_\theta^2\right)\Phi_2^{(p)} + (L-L_{av})\Phi_2^{(h)}$$

$$= (L_{av} - E_0)\Phi_2^{(h)} - E_2\Phi_0 + (L-L_{av})\Phi_2^{(p)}.$$

The first two terms on the right hand side of (4.35) have zero average in $\Theta$. Therefore, the solvability condition for $\Box_4$ becomes:

$$(L_{av}-E_0)\Phi_2^{(h)} = E_2\Phi_0 - \frac{1}{2\pi}\int_0^{2\pi}(L-L_{av})\Phi_2^{(p)} dp \quad (48)$$

$$= E_2\Phi_0 - \frac{1}{2\pi}\int_0^{2\pi}[V(r,\theta,p) - V_{av}(r,\theta)]\Phi_2^{(p)}(r,\theta,p)dp$$

$$= \left(E_2 + \frac{r^2}{2\pi}\int_0^{2\pi}|\partial_p^{-1}[V(r,\theta,p) - V_{av}(r,\theta)]|^2 dp\right)\Phi_0(r,\theta)$$

where equation (43) is used and where $\phi_p^{-1}$ denotes the mean-zero antiderivative. Thus, an outgoing solution of equation (48) is sought. This determines $E_2$ and therewith the expansion for the scattering resonance (effective index) through order $N^{-2}$.

This truncated expansion will now be used numerically to obtain the complex effective indexes (scattering resonances) for various structures. The details of the implementation are set out below. In particular, an explicit expression for $E_2$ (see equations (76), (77) and (69)) for the class of N-fold symmetric waveguides is derived.

Figure 5:
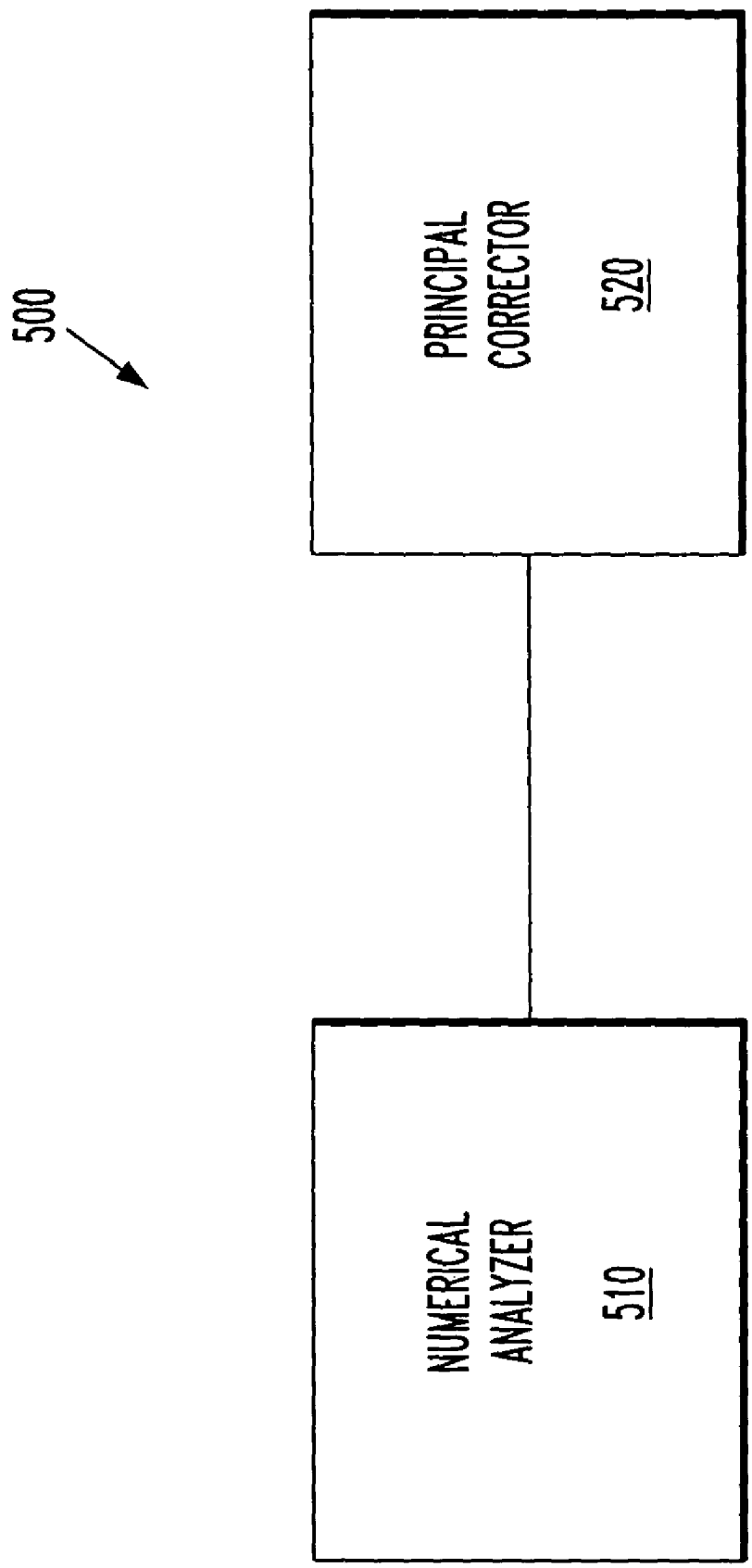
FIG. 5 illustrates a block diagram of one embodiment of a system for determining propagation characteristics of a photonic structure having a transverse N-fold symmetry constructed according to the principles of the present invention.

FIG. 5 illustrates a block diagram of one embodiment of a system, generally designated 500, for determining propagation characteristics of a photonic structure having a transverse N-fold symmetry constructed according to the principles of the present invention.

The system 500 includes a numerical analyzer 510. The numerical analyzer 510 employs a leading order systematic homogenization expansion having multiple scales to develop an angularly averaged indexed profile for the photonic structure in the previously described manner. The system 500 further includes a leading order corrector 520. The principal corrector 520. The principal corrector 520 is associated with the numerical analyzer 510 and employs details of the photonic structure and the homogenization expansion to obtain effective refractive indices of modes of the photonic structure, again as previously described.

Figure 6:
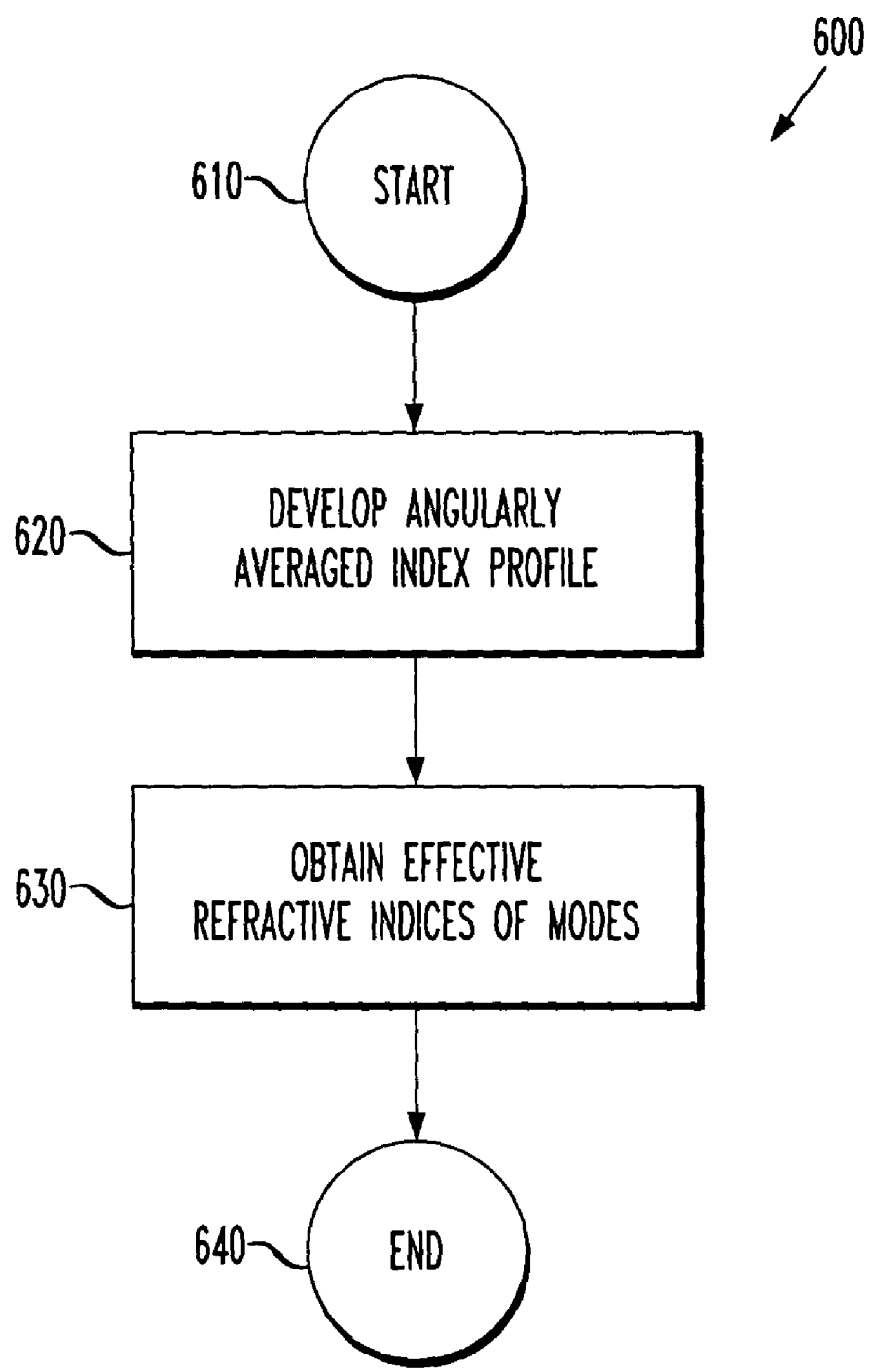
FIG. 6 illustrates a flow diagram of one embodiment of a method of determining propagation characteristics of a photonic structure having a transverse N-fold symmetry carried out according to the principles of the present invention.

FIG. 6 illustrates a flow diagram of one embodiment of a method, generally designated 600, of determining propagation characteristics of a photonic structure having a transverse N-fold symmetry carried out according to the principles of the present invention.

The method 600 begins with a start step 610, when it is desired to analyze a photonic structure to determine one or more of its physical characteristics. The method 600 proceeds to a step 620 in which a leading order systematic homogenization expansion having multiple scales is employed to develop an angularly averaged indexed profile for the photonic structure in the previously described manner. The method 600 then proceeds to a step 630 in which details details of the photonic structure and the homogenization expansion are employed to obtain effective refractive indices of modes of the photonic structure, again as previously described. The method ends in an end step 640.

Numerical Simulations for Selected Structures

The technique disclosed herein now illustrates the theory set forth above with numerical calculations performed for several classes of structures. The details of the implementation are set out below. The three classes of structures considered are:

Example 1: a ring of circular air holes 200 (FIG. 2A),

Example 2: an annulus of air supported with glass "webs" (FIG. 3A) and

Example 3: a subset of a hexagonal lattice (FIG. 4A).

The technique disclosed herein will identify individual leaky modes or scattering resonances, of these structures using the $LP_{1m}$ (linearly polarized) notation appropriate for solutions of the scalar wave equation. Usually this notation applies to guided modes, but no ambiguity will result, as none of the structures considered support-guided modes. The subscript $l \epsilon \{0, 1, 2, \ldots\}$ refers to the angular dependence $e^{il\Theta}$ of solutions to the averaged equation, while $m \epsilon \{1, 2, 3 \ldots\}$ indexes the collection of leaky modes with fixed l. This collection is ordered by $\Re n_{\mathit{eff}}$, with m=1 corresponding to the largest such value (when this rule is applied in guided modes, the usual meaning of m as the number of nodes in the radial wavefunction is recovered).

In the FIGUREs, distinct plotting symbols are used to represent different values of l; the various values of m for fixed l are not explicitly displayed but can be inferred from the monotonic relationship between m and $\Re n_{\mathit{eff}}$.

EXAMPLES 1 and 2

The geometries of Examples 1 and 2 were varied to produce a total of 30 different structures between them: The ring of holes was sealed to three different core sizes, while the annulus with webs was scaled to three different radii for each of two different air-fill fractions and three different periodicities $2\pi/N$. Each of the structures was approximated by a simple layered potential. (The web-supported annulus depicted in FIG. 3A is a simple layered potential without approximation). In all of the examples, the refractive index of glass was taken to be 1.45, and the holes were assumed empty. The calculations were all performed at $\lambda_{fs}$=1.55 μm. All of these structures support only continuous spectrum, so the complex eigenvalues associated with resonances of the structures are reported on.

Figure 2:
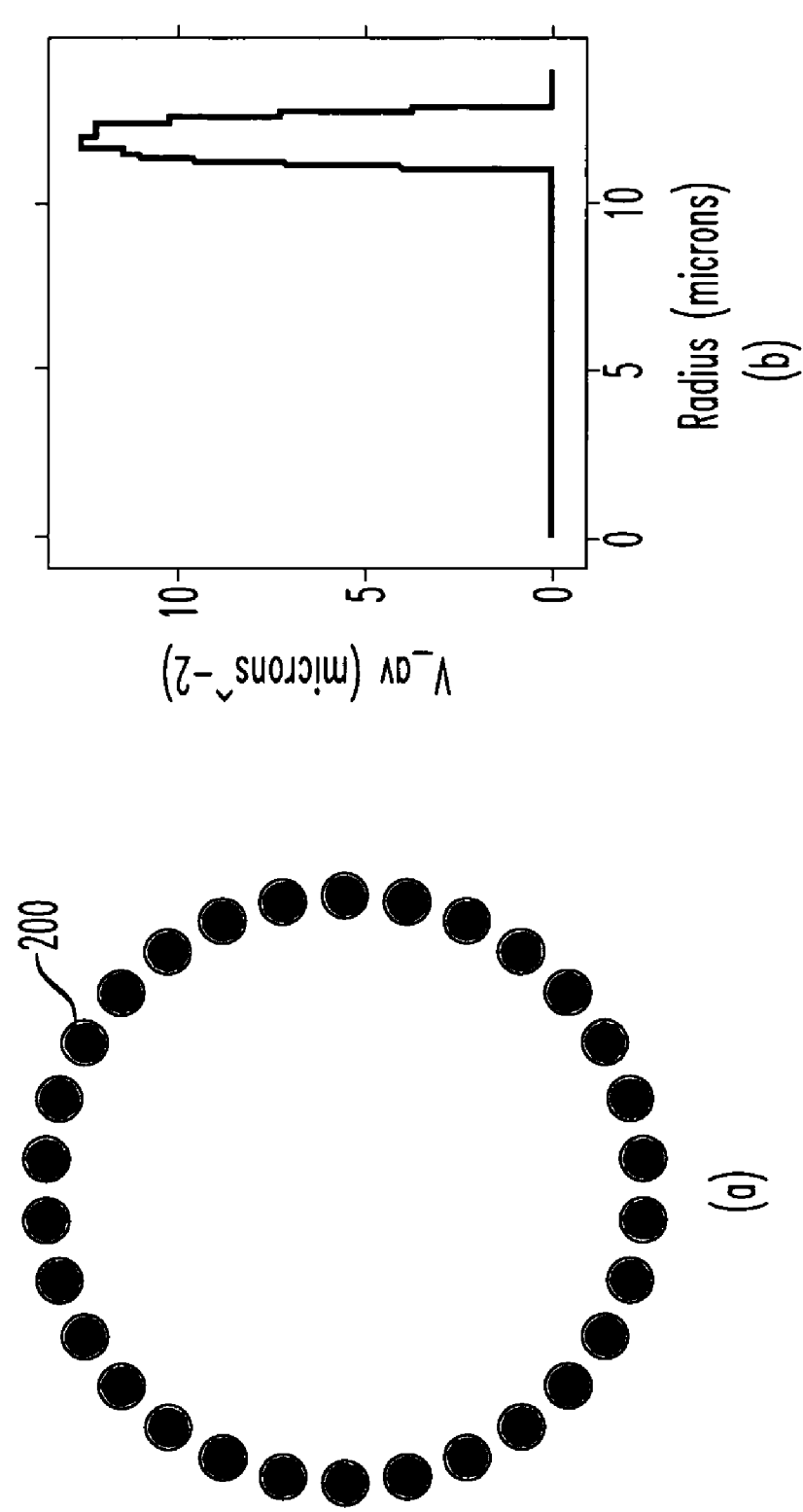
FIG. 2A illustrates a ring of N=30 air holes approximated by a simple layered potential with 11 layers, wherein the ratio $R_{hole}/R_{ring}$ of the hole radius to the ring radius is $0.7\pi/N$.
FIG. 2B illustrates a graph depicting the averaged potential $V_{av}$ with $R_{ring}$=12 µm.

The following sets of resonances for the rings of circles and webbed structures depicted in FIGS. 2A and 3A have been computed. Attention has been restricted to leaky mode solutions of the averaged structure with effective indexes $\Re n_{\mathit{eff}} \epsilon [1.41, 1.45]$, attenuation coefficients less than about 2 dB/mm, and angular index $l \epsilon \{0, 1, 2, 3\}$. To express these quantities in a notation consistent with the technique disclosed herein, recall from equation (6) that $$\beta = \sqrt{k^2 n_g^2 - E} \quad (49)$$

and that the effective index is given by $$n_{\mathit{eff}} = k^{-1} \beta. \quad (50)$$

Also, the attenuation $\gamma$ (in dB/cm, if β has units of 1/μm) of a leaky mode is given by $$\gamma = \frac{2 \times 10^5}{\ln(10)} \Im\beta \quad (51)$$

The factor of 2 in equation (51) is due to the definition of γ as the attenuation coefficient for intensity, rather than field amplitude. Once this set of leaky modes of the averaged potential is found, the leading order corrections $E_2$ to the leading order energies $E_0$ can be computed.

Figure 7:
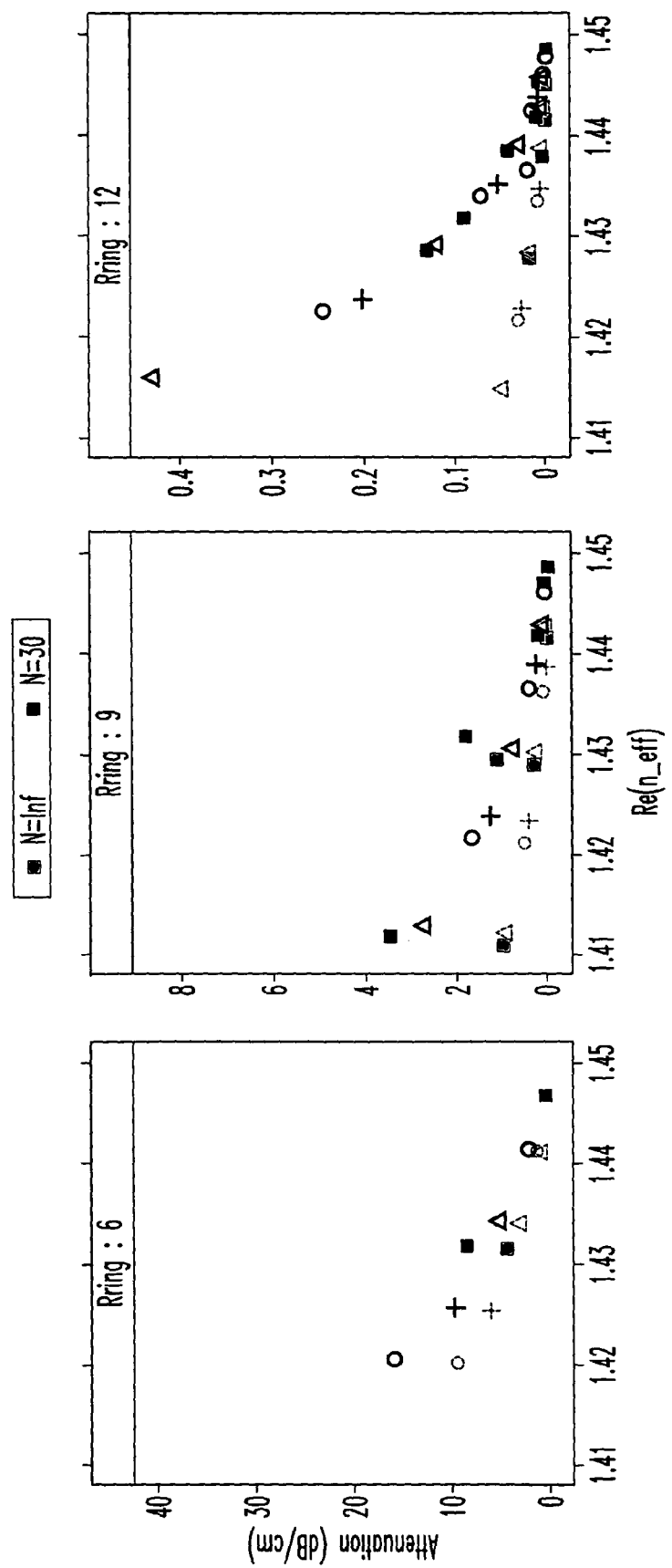
FIG. 7 illustrates the effective indexes and attenuation coefficients of a set of the least-lossy resonances with l∈{0, 1, 2, 3} of the structure depicted in FIG. 2, scaled to three different ring radii.

The results for the three-scaled rings of circles (FIG. 2A) are presented in FIG. 7. Also, those for the three scalings and two air-fill fractions, along with various values of the periodicity N, of the ring of "air wedges" are presented in FIG. 8.

Figure 3:
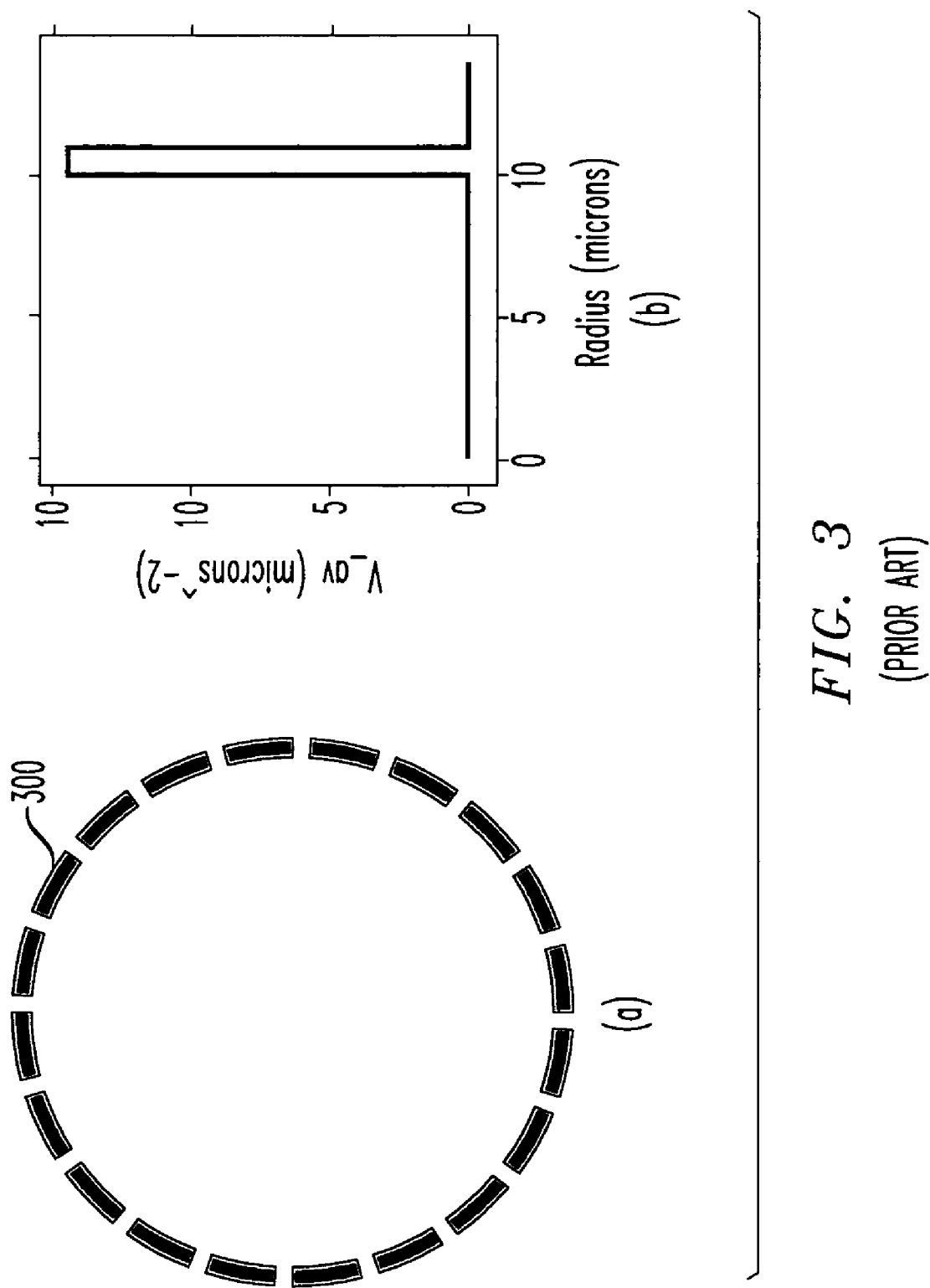
FIG. 3A illustrates a ring of "air wedges" supported by N=20 webs of glass, wherein the ratio $R_{in}/R_{out}$ of the inner to outer radii of the annulus is 10/11 and the air fill fraction within the annulus is f=0.8.
FIG. 3B illustrates a graph depicting the averaged potential $V_{av}$ with $R_{in}$=10 µm.
Figure 9:
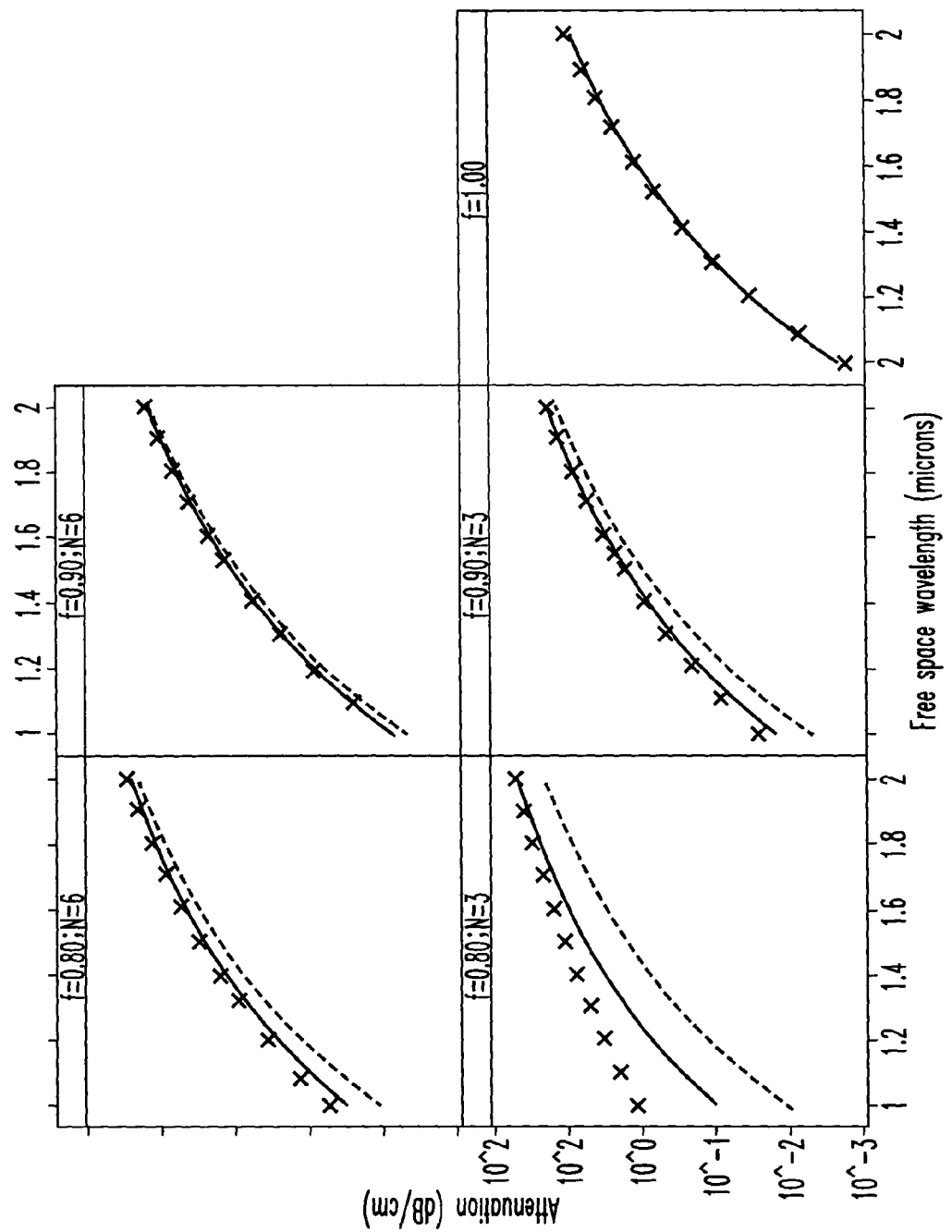
FIG. 9 illustrates an attenuation of the lowest order (fundamental, or $LP_{01}$) resonance for a structure of the type shown in FIG. 3, with $R_{in}$=1 µm, $R_{out}$=2 µm for the fill fractions f=0.8, 0.9, and 1, with N=3 and N=6 holes.

Resonances of a structure of the type shown in FIG. 3 with $R_{in}$=1 μm, $R_{out}$=2 μm for the fill fractions f=0.8, 0.9, and 1, with N=3 and N=6 holes were also computed. The calculations were performed for a range of free-space wavelengths $\lambda_{fs}$ ranging from 1 μm to 2 μm. The structure with f=1 is an idealized ring of air with no supporting structure. In FIG. 9, the results of the theory to parallel calculations performed by a Fourier decomposition algorithm were compared. It can be observed that the two methods agree exactly for the f=1 case, as they should.

Additionally, in all cases the present method agrees with the Fourier calculation as $\lambda_{fs} \to 2$ μm. Even for smaller $\lambda_{fs}$ the agreement is quite good except for the f=0.8, N=3 case, which is not surprising given the small value of N and the fact that the width of the ring is equal to the smallest free space wavelength considered. The plots displayed in FIG. 9 are consistent with the expectation that approximation by the homogenization expansion improves (1) for fixed $\lambda_{fs}$ and increasing N, as well as (2) for fixed N and increasing $\lambda_{fs}$.

The dashed lines in FIG. 9 display the attenuations of the averaged structures, without the $O(N^{-2})$ correction. The necessity of including those corrections is evident, though the effect in these structures is not as dramatic as in some of the other structures considered, including that of Example 3 below.

Another result is the effective index of the first excited state above the fundamental (the $LP_{11}$ state) for the f=0.9, N=3 structure at $\lambda_{fs}$=1.55 μm. In Table 1, the results of the Fourier method with truncations of the homogenization expansion to one and two terms, for both the fundamental and first excited leaky modes are compared. It can be noted that the one-term (averaged theory) truncation predicts the real part of the effective index well, but again, the $O(N^{-2})$ corrections are necessary to obtain good agreement of the attenuation rates.

TABLE 1

| | Homogeninzation Expansion Versus Fourier | | | | | |
|---|---|---|---|---|---|---|
| | $0^{th}$ Order Homogenization | | $2^{nd}$ Order Homogenization | | Fourier | |
| Mode | $n_{\mathit{eff}}$ | Atten | $n_{\mathit{eff}}$ | Atten | $n_{\mathit{eff}}$ | Atten |
| $LP_{01}$ | 1.3712 + 0.0000387i | 1.36 | 1.3727 + 0.0000644i | 2.27 | 1.365 + 000071i | 2.48 |
| $LP_{11}$ | 1.2468 + 0.000436i | 15.3 | 1.2515 + 0.000832i | 29.3 | 1.255 + 0.00075i | 27 |

EXAMPLE 3

Figure 4:
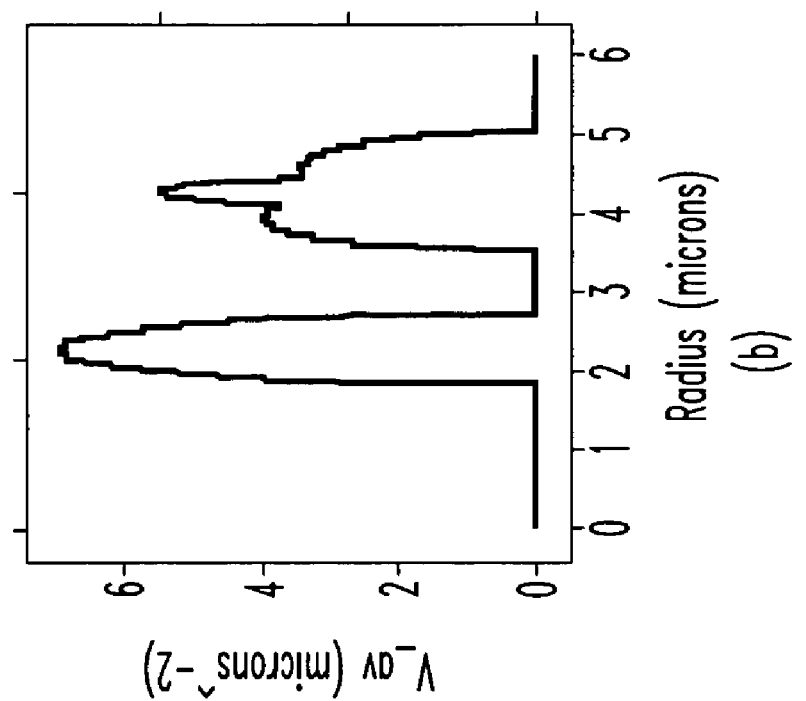
FIG. 4A illustrates an 18-hole subset of a hexagonal lattice (N=6) with inter-hole spacing A=2.3 µm and hole radius $R_{hole}$=0.46 µm, approximated by a simple layered potential with L=51 layers.
FIG. 4B illustrates the averaged potential $V_{av}$ in units of (µm)$^{-2}$ verus radius in units of µm.
Figure 4:
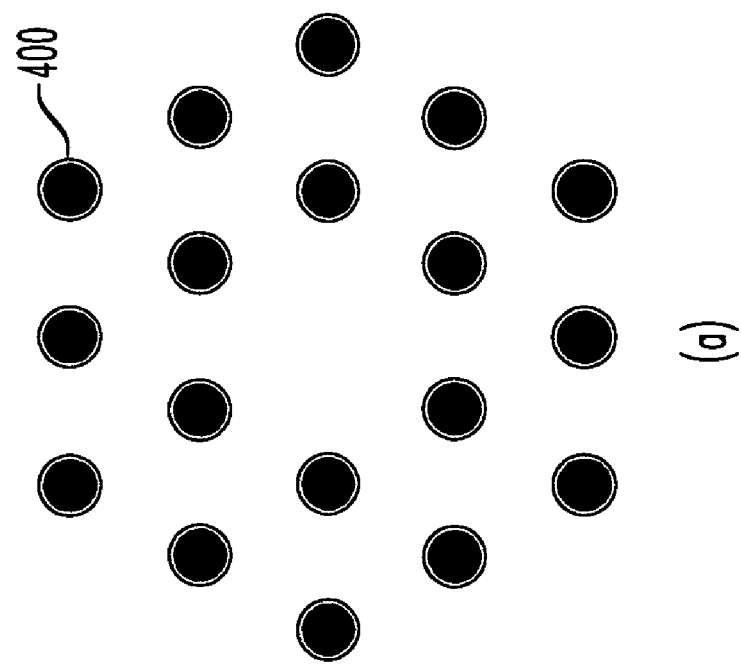

Finally, the structure depicted in FIG. 4 is considered. This is an 18-hole subset of a hexagonal lattice (N=6) with inter-hole spacing $\Lambda=2.3$ μm and hole radius $R_{hole}=0.46$ μm. Notice that the fundamental ($LP_{01}$) resonance has a leakage rate of 14 dB/cm, while that of the averaged structure was 0.92 dB/cm. By comparison, the solution to the full vector problem using a multipole method with outgoing radiation conditions results in a rate of 16 dB/cm. In this example, the effect of the $N^{-2}E_2$ microstructure correction on the leakage rates is even more apparent than in Example 2. However, it cannot be said how much of the discrepancy is due to vector effects, and how much to the other approximations in this method.

Convergence as $N \to \infty$

A consistency check on the implementation of the scheme described above for simple layered potentials will now be described. The first non-trivial corrections $N^{-2}\Phi_2$ and $N^{-2}E_2$ are computed to the field and energy, respectively, in equation (24) and express the field and the approximation plus error terms:

$$\Phi = \Phi_0 + \frac{1}{N^2}\Phi_2 + \Phi_3^{(N)} \tag{52}$$

$$E = E_0 + \frac{1}{N^2}E_2 + E_3^{(N)}.$$

It is then considered by how much the mode equation (9) is not satisfied by the first two terms of the expansion equation (52). Therefore, the residual is defined as:

$$F_{res} \equiv \left(-\Delta + V - \left(E_0 + \frac{1}{N^2}E\right)\right). \tag{53}$$

Substituting equation (52) into equation (9), it is observed that the residual is given by $$F_{res} = E_3^{(N)}\left(\Phi_0 + \frac{1}{N_2}\Phi_2 + \Phi_3^{(N)}\right) - \left(\Delta + V - \left(E_0 + \frac{1}{N^2}E_2\right)\right)\Phi_3^{(N)}. \tag{54}$$

$F_{res}$ is expected to be of order $N^{-1}$, because $\Phi_3^{(N)}$ and $E_3^{(N)}$ are formally of order $N^{-3}$ and the Laplacian in (54), when acting on the fast dependence, gives a factor of $N^2$. Indeed, in expanding $F_{res}$ in powers of $1/N$, it is found that when l>0, the leading term, $F_{res}^1$, is the $$O\left(\frac{1}{N}\right)$$

term $$F_{res}^{(1)} = \frac{1}{Nr^2}\partial_\Theta^2\Phi_3. \tag{55}$$

This may be simplified using equations (46) and (43) to $$F_{res}^{(1)} = -\frac{2}{N}(\partial_\theta\Phi_0)(\partial_\Theta^{-1}(V - V_{av})). \tag{56}$$

Therefore, when l>0 it is expected that as $N \to \infty$ $$F_{res} \to F_{res}^{(1)} \sim O\left(\frac{1}{N}\right) \text{ and } F_{res} - F_{res}^{(-1)} \sim O\left(\frac{1}{N^2}\right). \tag{57}$$

when $l=0(\Phi_0=\Phi_0(r))$, $\partial_\theta\Phi_0$ vanishes and the leading behavior of the residual is higher order in 1/N.

Since the potential V or its derivatives may have discontinuities, a problem is encountered when attempting to compute $F_{res}$ using equation (54). For example, it is possible that $\Phi_2^{(p)}$ is discontinuous as a function of r. Equation (54) is, therefore, interpreted as holding in the "weak sense" or sense of distributions, and both sides are integrated against a radial test function $\phi_R(r)$ of compact support. This allows one to move the radial part of the Laplacian over to act on $\phi_R$ and to define the "weak residual"

$$F_{res}^{(weak)}(\theta) = \int_0^\infty rdr\left(-\phi_R'' - \frac{1}{r}\phi_R' - \phi_R\frac{1}{r^2}\partial_\theta^2 + \right. \tag{58}$$

$$\phi_R\left(V - E_0 - \frac{1}{N^2}E_2\right)\right)$$

$$\left(\Phi_0 + \frac{1}{N^2}\Phi_2\right)$$

and its leading behavior in 1/N $$F_{res}^{(weak,1)}(\theta) = -\frac{2}{N}\int_0^\infty rdr\phi R(\partial_\theta\Phi_0)(\partial_\Theta^{-1}(V - V_{av})) \tag{59}$$

Figure 8:
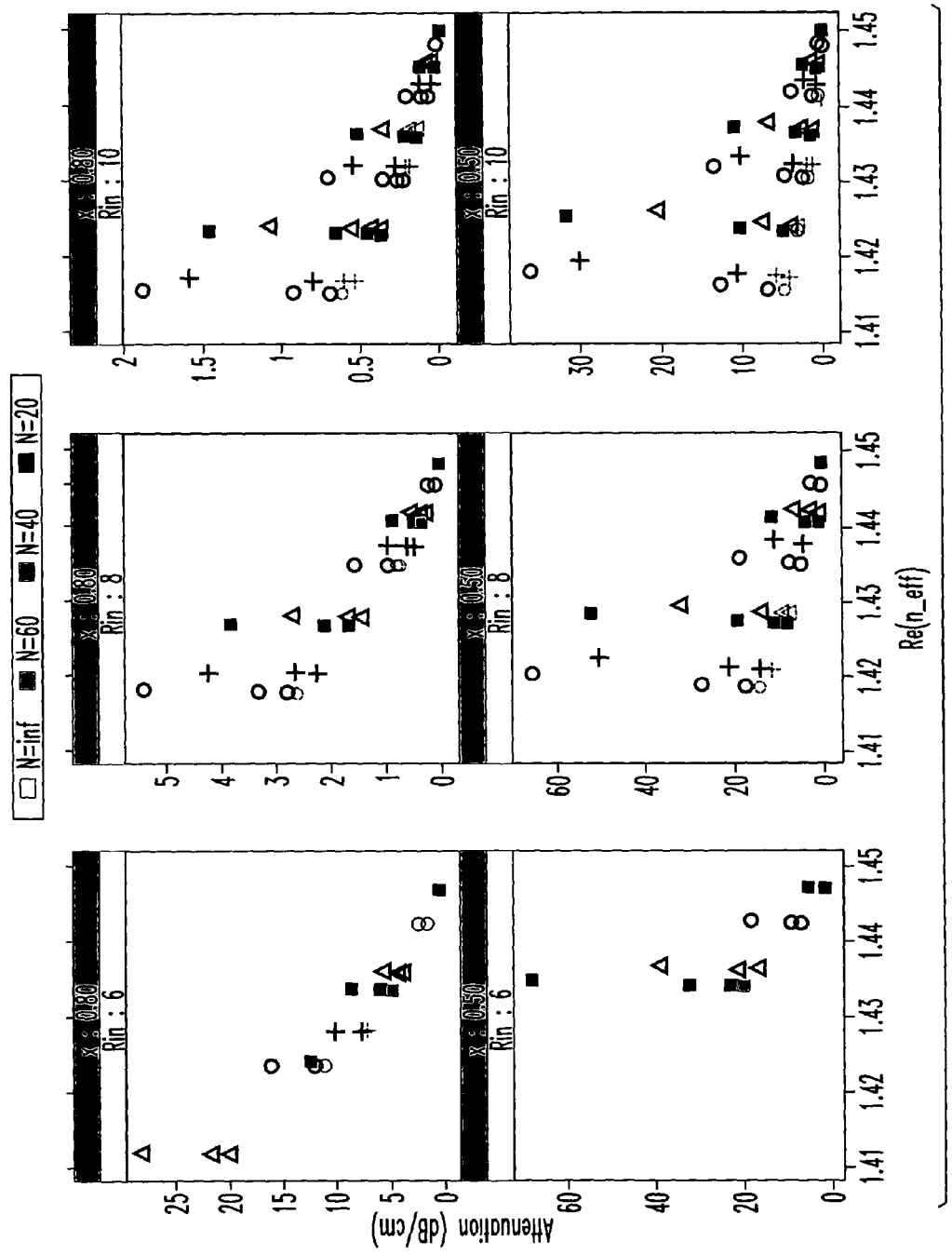
FIG. 8 illustrates the effective indexes and attenuation coefficients of a set of the least lossy resonances with l∈{0, 1, 2, 3} of the structure depicted in FIG. 3, for two choices of fill fraction x and three different radii.
Figure 10:
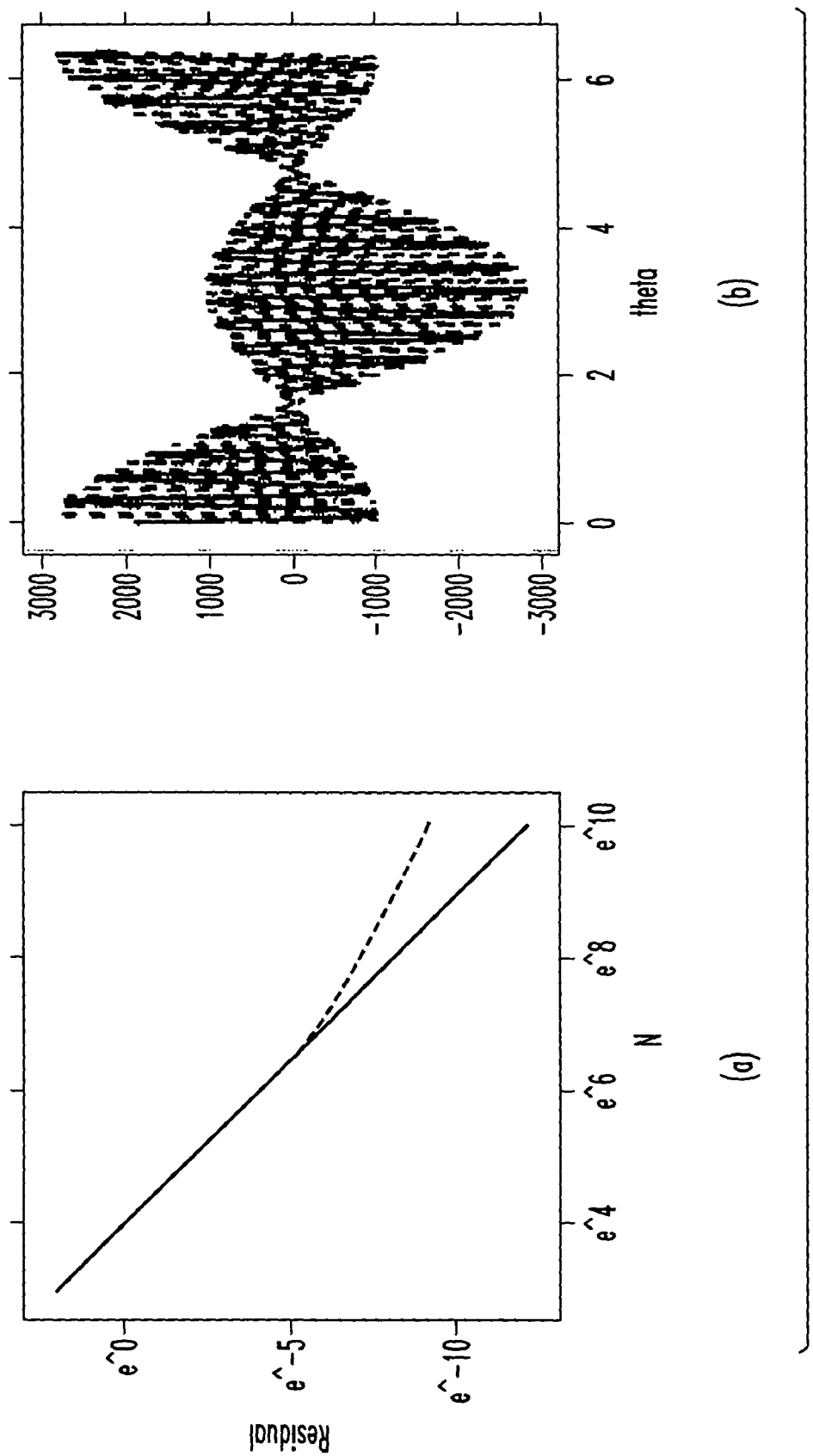
FIG. 10A illustrates results of the weak residual calculation $\|F_{res}^{(weak)}(\theta) - F_{res}^{(weak,1)}(\theta)\|_\infty$ and $\|F_{res}^{(weak)}(\theta)\|_\infty$.
FIG. 10B illustrates results of the weak residual calculation $N^2 \Re(F_{res}^{(weak)}(\theta) - F_{res}^{(weak,1)}(\theta))$ for different N.

Equations (58) and (59) have been computed for the structure of Example 2 (FIG. 3) with $R_{in}=10$ μm, $R_{out}=11$ μm for the $LP_{11}$ leaky mode. Further, N is allowed to vary from 20 to 22,000. The results are presented in FIG. 8. The solid line in FIG. 8A represents $\|F_{res}^{(weak)}(\theta)-F_{res}^{(weak,1)}(\theta)\|_\infty$ as a function of N. The scales are logarithmic on both axes so the slope of −2 verifies that equation (57) holds over the entire range considered. The dashed line in FIG. 10A represents $\|F_{res}^{(weak)}(\theta)\|_\infty$. It should be noted that the slope changes from −2 to −1 at around N=1000, which again verifies equation (57).

FIG. 10B shows the pointwise behavior of the weak residuals by plotting $N^2\Re(F_{res}^{(weak)}(\theta)-F_{res}^{(weak,1)}(\theta))$ vs. θ for N=20 and N=54. The envelope of the residuals is invariant after scaling by $N^2$, suggesting that the $N^2$ term dominates the residual after the loading term is subtracted, even for those moderate values of N. This behavior persists for all values of N considered, up to N=22,000.

Implementation of Homogenization Expansion

The procedure used to obtain the simulation results above will now be outlined. It is specialized to the case of a potential with no slow angular dependence, so $V(r,\theta,\Theta)=V(r,\Theta)$ In this case the potential has an N-fold symmetry.

This discussion pertains to N-fold symmetric microstructure, whose individual microfeatures have arbitrary geometry. The strategy is to then approximate a general microstructure potential V by a simple layered potential. For the case of simple layered potentials, analytic expressions can be obtained which facilitate the numerical computations.

General Structures

The angularly average potential is a radial function, $V_{av}=V_{av}(r)$. One can take $$\Phi_0(r,\theta)=f(r)e^{il\theta}$$

$l$ being an integer. Then, $f(r)$ satisfies $$\left(-\Delta_r + \frac{l^2}{r^2} + V_{av}(r) - E_0\right)f(r) = 0 \quad (60)$$

A solution of the resonance problem is a pair $(f(r),E_0)$, such that $f(r)$ is a nonsingular solutions of equation (60) satisfying an outgoing radiation condition at $r=\infty$, equation (12). As noted above, $E_0$ is complex with $\Im E_0<0$.

In general, the existence of solutions to the resonance problem is a subtle technical problem. It will now be analyzed in detail for the particular class of simple layered potentials, which will be defined. The existence of a solution, $(f(r),E_0)$ will also be firmly set.

Note that since $V_{av}(r)=0$ for $r \geq r_*$, $$f(r)=k_* H_l^{(1)}(\sqrt{E_0}r), r \geq r_* \quad (61)$$

for some constant $k_*$.

The leading order correction, $N^{-2}\Phi_2$, is then calculated by the perturbation scheme. In the separable case, the equation for $\Phi_2^{(h)}$ is of the form:

$$(L_{av}-E_0)\Phi_2^{(h)}=(E_2+Q(r))\Phi_0 \quad (62)$$

where $Q(r)$ has compact support. Since $\Phi_0(r,\theta)=f(r)e^{il\theta}$, all of the Fourier modes of $\Phi_2^{(h)}(r,\theta)$ except the first vanish, and so $\Phi_2^{(h)}(r,\theta)=U(r)e^{il\theta}$ is defined, and one can consider the equation $$\left(-\Delta_r + \frac{l^2}{r^2} + V_{av}(r) - E_0\right)U(r) = (E_2 + Q(r))f(r). \quad (63)$$

Recall that by equation (8) both Q and $V_{av}$ are zero for $r \geq r_*$ and one gets $$\left(-\Delta_r + \frac{l^2}{r^2} - E_0\right)U(r) = E_2 f(r), r \geq r_*. \quad (64)$$

One can proceed with the solution of the inhomogeneous problem (equation (63)) for $r \geq 0$ and then obtain an expression for $E_2$ by imposing the outward going radiation condition.

It has been assumed that V is regular at the origin. One can let $\tilde{y}_1(r)$ denote the solution to the homogeneous equation associated with equation (63) that is regular at $r=0$, and denote an independent solution, which together with $\tilde{y}_1$ spans the solution set. Then $\tilde{y}_1(r) \propto r^l$ and $\tilde{y}_2(r) \propto r^{-l}$ if $l>0$, or $\tilde{y}_1(r) \propto \ln r$ if $l=0$. For $r \geq r_*$, an appropriate set of homogeneous solutions of equation (64) is in terms of Hankel functions, $H_l^{(j)}(\sqrt{E_0}r), j=1,2$. $H_l^{(1)}$ satisfies the outward going radiation condition at infinity and $H_l^{(2)}$ the inward going radiation condition at infinity.

A particular solution of equation (63) can be constructed by variation of parameters using these homogeneous solutions in the intervals $R_{in}=(0,r_*)$ and $R_{out}=(r_*,\infty)$. $g_{in}[F]$ is defined to denote a choice of particular solution of $$\left(-\Delta_r + \frac{l^2}{r^2} + V_{av}(r) - E_0\right)g_{in}[F] = F(r), 0 \leq r < r_*(r \in R_{in}) \quad (65)$$

$g_{out}[F]$ to denote a choice of particular solution of $$\left(-\Delta_r + \frac{l^2}{r^2} - E_0\right)g_{out}[F] = F(r), r_* \geq r(r \in R_{out}). \quad (66)$$

Then, one gets in $R_{in}$: $U(r)=E_2 g_{in}[f](r)+g_{in}[Qf](r)$ (67)

in $R_{out}$: $U(r)=\xi_* H_l^{(1)}(\sqrt{E_0}r)+\eta_* H_l^{(2)}(\sqrt{E_0}r)+E_2 g_{out}[f](r)$ (68)

where the coefficients $\xi_*$ and $\eta_*$ are determined by imposing continuity of U and $\partial_r U$ at $r=r_*$:

$$\begin{pmatrix} \xi_* & (E_2) \\ \eta_* & (E_2) \end{pmatrix} = E_2 y^{-1}(r_*) \begin{pmatrix} g_{in}[f](r_*) - g_{out}[f](r_*) \\ E_0^{-\frac{1}{2}}(\partial g_{in}[f](r_*) - \partial g_{out}[f](r_*)) \end{pmatrix} + y^{-1}(r_*) \begin{pmatrix} g_{in}[Qf](r_*) \\ E_0^{-\frac{1}{2}}\partial g_{in}[Qf](r_*) \end{pmatrix}, \quad (69)$$

with $$y(r) = \begin{pmatrix} H_l^1(\sqrt{E_0}r) & H_l^2(\sqrt{E_0}r) \\ \partial_s H_l^1(\sqrt{E_0}r) & \partial_s H_l^2(\sqrt{E_0}r) \end{pmatrix}.$$

with $\xi_*$ and $\eta_*$ given by equation (69), equations (67) and (68) define a nonsingular solution of equation (63). It remains to impose radiation condition at $r=\infty$. Consider $U(r)$ for $r \geq r_*$. Let $$z=\sqrt{E_0}r; z_*=\sqrt{E_0}r_*, G(z)=U(r(z)).$$

Then, equation (64) becomes:

$$z^2 G'' + z G' + (z^2 - l^2)G = \frac{E_2}{E_0}k_* z^2 H_l^{(1)}(z), r(z) \geq r_*. \quad (70)$$

By equations (68) and (61)

$$G(z) = U(r(z)) = \xi(E_2)H_l^{(1)}(z) + \eta_*(E_2)H_l^{(2)}(z) + \frac{E_2}{E_0}k_* g_{out}[H_l^{(1)}](z). \quad (71)$$

$g_{out}$ can be constructed by variation of parameters. A particular solution is $$\xi_*^{(p)}(z)H_l^{(1)}(z) + \eta_*^{(p)}(z)H_l^{(2)}(z)$$

-continued where $$\eta_*^{(p)}[h](z) = +\int_{z_*}^{z} \frac{H_l^{(1)}(\zeta)h(\zeta)}{\zeta^2 W\{H_l^{(1)}, H_l^{(2)}\}} d\zeta \qquad (72)$$

$$\xi_*^{(p)}[h](z) = -\int_{z_*}^{z} \frac{H_l^{(2)}(\zeta)h(\zeta)}{\zeta^2 W\{H_l^{(1)}, H_l^{(2)}\}} d\zeta \qquad (73)$$

Therefore, $$g_{out}[F](z) = (\xi_*^{(p)}[\zeta^2 F](z)H_l^{(1)}(z) + \eta_*^{(p)}[\zeta^2 F](z)H_l^{(2)}(z)). \qquad (74)$$

Using equation (74) in equation (71), one gets:

$$G(z) = U(r(z)) = \xi(E_2)H_l^{(1)}(z) + \eta_*(E_2)H_l^{(2)}(z) - \qquad (75)$$
$$\frac{i\pi}{4}\frac{E_2}{E_0}k_*\int_{z_*}^{z} H_l^{(2)}(\zeta)H_l^{(1)}(\zeta)\zeta\, d\zeta H_l^{(1)}(z) +$$
$$\frac{i\pi}{4}\frac{E_2}{E_0}k_*\int_{z_*}^{z} [H_l^{(1)}(\zeta)]^2 \zeta\, d\zeta H_l^{(2)}(z).$$

Recall that $\xi_*(E_2)$ and $\eta_*(E_2)$ are determined by the continuity conditions at $r=r_*$, and are given by equation (69). The condition determining $E_2$ is that the incoming part of $G(z)$ be identically zero. Derivation of this condition on $E_2$ requires the use of certain integral identifies involving Hankel functions.

Note that both terms in equation (75) that are proportional to $H_l^{(1)}$ are outgoing, as can be seen by referring to their asymptotic forms. Now one gets $$\int \zeta [H_l^{(j)}(\zeta)]^2 d\zeta = \frac{\zeta^2}{2}([H_l^{(j)}(\zeta)]^2 - H_{l-1}^{(j)}(\zeta)H_{l+1}^{(j)}(\zeta)).$$

Therefore, the terms in equation (75) that are proportional to $H_l^{(2)}$ can be written as:

$$\eta_*(E_2)H_l^{(2)}(z) + \frac{ik_*\pi}{4}\frac{E_2}{E_0}\frac{\zeta^2}{2}\left([H_l^{(1)}(\zeta)]^2 - H_{l-1}^{(1)}(\zeta)H_{l+1}^{(1)}(\zeta)\right)\Big|_{z_*}^{z} H_l^{(2)}(z) =$$
$$\left[\eta_*(E_2) - \frac{ik_*\pi}{4}\frac{E_2}{E_0}\frac{z_*^2}{2}\left([H_l^{(1)}(z_*)]^2 - H_{l-1}^{(1)}(z_*)H_{l+1}^{(1)}(z_*)\right)\right]H_l^{(2)}(z) +$$
$$\frac{ik_*\pi}{4}\frac{E_2}{E_0}\frac{z^2}{2}\left([H_l^{(1)}(z)]^2 - H_{l-1}^{(1)}(z)H_{l+1}^{(1)}(z)\right)H_l^{(2)}(z).$$

Again from the asymptotic form of $H_l^{(1)}$, the latter term is seen to be outgoing at infinity so the condition $E_2$ is:

$$\eta_*(E_2) - \frac{ik_*\pi}{4}\frac{E_2}{E_0}\frac{z_*^2}{2}\left([H_l^1(z_*)]^2 - H_{l-1}^{(1)}(z_*)H_{l+1}^{(1)}(z_*)\right) = 0 \qquad (76)$$

$\eta_*(E_2)$ can then be written as $$\eta_*(E_2) = \eta_{*0} + E_2 \eta_* \qquad (77)$$

where $\eta_{*0,1}$ can be read off from the second component of equation (69). Equations (76) and (77) give a linear relation for $E_2$ that can be solved.

B. Simple Layered Potentials: Leading Order Resonances

Figure 11:
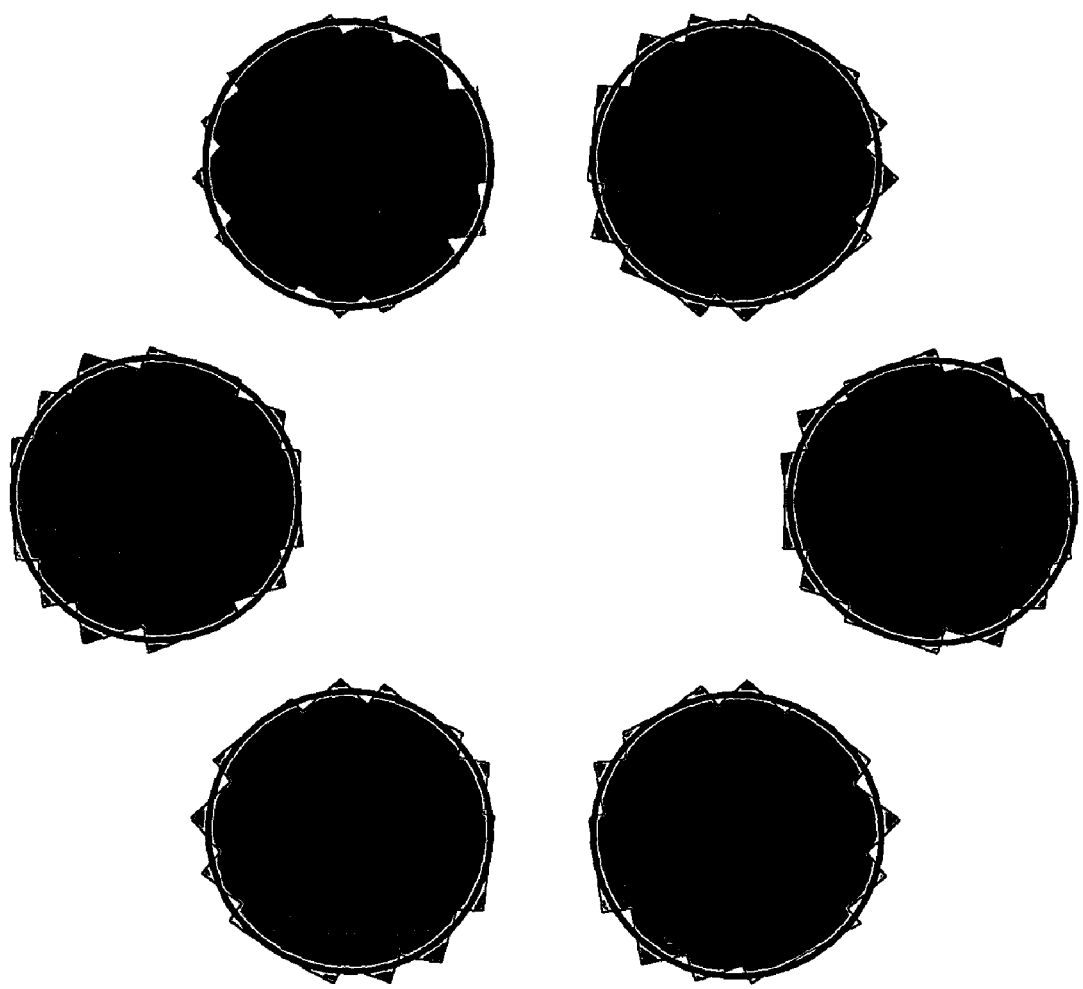
FIG. 11 illustrates an example of a simple layered approximation to a structure containing six circular air holes.

An implementation of the above scheme is now outlined for a case of a simple layered potential, which is defined to be one with potential $V(r,\theta,\Theta)$ that is both independent of the slow angular variable $\theta$ and is a simple function of the form $$V(r,\Theta) = \sum_{i=1}^{L}\sum_{j=1}^{M_i} 1_{[r_i, r_{i+1}]}(r) 1_{[\Theta_j, \Theta_{j+1}]}(\Theta) V_{i,j} \qquad (78)$$

where L is the number of radial layers and $M_i$ is the number of angular sectors in one period of the $i^{th}$ layer. $1_A(\zeta)$ denotes the indicator function of the set A, taking the value one for $\zeta \in A$ and zero for $\zeta \notin A$. By definition, $r_1=0$, $\Theta_1=0$ and $\Theta_{M_i+1}=2\pi$. The potential in equation (78) has, as a function of $\theta$, $M_i$ jumps in layer $R_i$ and, as a function of $\theta N M_i$, jumps in layer $R_i$. An example of a simple layered approximation to a structure containing six circular air holes is presented in FIG. 11.

With the definition in equation (78) of $V(r,\Theta)$, $V_{av}(r)$ is constant on each region $R_i = [r_i, r_{i+1}]$; equivalently, $$V_{av}(r) = V_{av,i}, r \in R_i. \qquad (79)$$

In the special case where the index profile, $r(r,\theta)$, takes on two values $n_g$ and $n_h$ and $2\pi f_i$ denotes the total angle of the annulus $R_i$ occupied by "material h", one gets by averaging V in equation (6):

$$V_{av}(r) = k^2 f_i [n_g^2 - n_h^2], r \in R_i. \qquad (80)$$

In each internal $R_i$, the radial wavefunction $f(r)$ can be expressed as a linear combination of Bessel and modified Bessel functions:

$$f(r) = \sigma_i y_1(z(r)) + \tau_i y_2(z(r)) \qquad (81)$$

the definitions of $y_1$, $y_2$ and $z$ depend on the sign of $\Re(E_0 - V_{av})$: $z = (\pm(E_0 - V_{av}))^{1/2}r$; for $i < L$, $y_1 = J_l$ or $I_l$, $y_2 = Y_l$ or $K_l$; while in the outer region $i=L$ we let $y_1 = H_l^{(1)}$, $y_2 = H_l^{(2)}$. The condition that the solution be nonsingular at $r=0$ implies that $$\begin{pmatrix}\sigma_1 \\ r_1\end{pmatrix} = \begin{pmatrix}1 \\ 0\end{pmatrix} \qquad (82)$$

or a multiple thereof. The values of $(\sigma_i, \tau_i)$ in some interval i determines the values $(\sigma_{i+1}, \tau_{i+1})$ by continuity of $f(r)$ and its derivative at the interface. This relationship may be expressed by a transfer matrix $T_i(E_0)$, which gives rise to the relationship between the coefficients in the outermost layer and those in the innermost:

$$\begin{pmatrix}\sigma_L \\ r_L\end{pmatrix} = T(E_0)\begin{pmatrix}\sigma_1 \\ r_1\end{pmatrix} \qquad (83)$$

where $$T(E_0) = T_{L-1}(E_0) \ldots T_2(E_0)T_1(E_0). \qquad (84)$$

The radiation condition is equivalent to the orthogonality of $(0, 1)$ and $(\sigma_L, \tau_L)$. Therefore, the resonance or scattering energies are determined by the following scalar transcendental equation:

$$(0 \quad 1)T(E_0)\begin{pmatrix}1\\0\end{pmatrix}=0 \tag{85}$$

or, equivalently $$T_{2l}(E_0)=0 \tag{86}$$

where $T_{kj}$, denotes the (k, j) energy of the matrix $T(E_0)$. C. Simple Layered Potentials: Microstructure Corrections to $\Phi_0$ and $E_0$ The order $N^{-2}$ correction to $\Phi_0$ will now be constructed, which is $N^{-2}\Phi_0$ and to $E_0$, which is $N^{-2}E_2$ for the special case of a simple layered potential given in equation (78).

Recall that $\Phi_2=\Phi_2^{(p)}+\Phi_2^{(h)}$. Here $\Phi_2^{(p)}$ is, in general, given by the Fourier series of equation (43). When the potential is of the form given in equation (78), $\Phi_2^{(p)}$ can be explicitly calculated as described below. $\Phi_2^{(h)}$ solves equation (48) and $E_2$ is chosen so that equation (43) has a solution satisfying the outgoing radiation condition at $r=\infty$. We now focus on the determination of $E_2$ and $\Phi_2^{(h)}$ in the separable case. Recall that the equation (48), for $\Phi_2^{(h)}$, is of the form:

$$(L_{av}-E_0)\Phi_2^{(h)}=(E_2+Q(r))\Phi_0 \tag{87}$$

where $Q(r)$ has compact support; its explicit form for simple structures is presented below. Since $\Phi_0(r,\theta)=f(r)e^{il\theta}$, one can define $\Phi_2^{(h)}(r,\theta)=U(r)e^{il\theta}$ and consider the equation $$\left(-\Delta_r+\frac{l^2}{r^2}+V_{av}(r)-E_0\right)U(r)=(E_2+Q(r))f(r). \tag{88}$$

The solution of equation (88) in region $R_q$ can be written as $$U_q(r)=U_q^{(p)}(z(r))+\xi_q y_1(z(r))+\eta_q y_2(z(r)) \tag{89}$$

where the definitions of $Y_1$, $Y_2$, and z are the same as in equation (81), and $U_q^{(p)}$ denotes a particular solution obtained by variation of parameters. As above, the coefficients $(\xi_{q+1},\eta_{q+1})$ can be obtained from $(\xi_q,\eta_q)$ by imposing continuity of $U(r)$ and its derivative at the interface.

The details are omitted, but note that the transfer matrix formulation from equation (82) is modified in this case to reflect the presence of a homogeneous term:

$$\begin{pmatrix}\xi_{q+1}\\\eta_{q+1}\end{pmatrix}=F_q(E_2)+T_q\begin{pmatrix}\xi_q\\\eta_q\end{pmatrix}. \tag{90}$$

Note that the matrix $T_q$ does not depend on $E_2$, while $F_q$ does.

The solution in the innermost region $R_1$, $U_1(r)$, must be regular at the origin. Through a choice of particular solution, one may take the homogeneous part of the solution in this region to be identically zero. Then, iteration of equation (90) yields:

$$\begin{pmatrix}\xi_L(E_2)\\\eta_L(E_2)\end{pmatrix}=F_L+S_LF_{L-1}+S_LS_{L-1}F_{L-2}+\ldots S_LS_{L-1}\ldots S_2F_1. \tag{91}$$

The radiation condition in the outermost region $R_L$ remains to be imposed. Note that $Q(r)\equiv 0$ in (7.28), and that by construction $\Box_0$ is outgoing and thus can be written as $$\Phi_0(r,\theta)=\sigma_L H_l^{(1)}(\sqrt{E_o}r). \tag{92}$$

Therefore to impose the radiation condition on the correction and thereby obtain $E_2$, equation (70) with $k_*=\sigma_L$ may be used. The calculations above can therefore be used to obtain a particular solution. This gives the equation for $E_2$:

$$\eta_L(E_2)-\frac{i\sigma_L\pi}{4}\frac{E_2}{E_0}z_L^2([H_l^{(1)}(z_L)]^2-H_{l-1}^{(1)}(z_L)H_{l-1}^{(1)}(z_L))=0 \tag{93}$$

where $$\eta_L(E_2)\equiv\eta_{L0}+E_2\eta_{L1} \tag{94}$$

is read off from equation (91). $E_2$ is then found by solving the linear relation given in equations (93) and (94).

Calculations for Simple Layered Potentials

Expressions needed to compute the leading corrections to $\Phi_0$ and $E_0$ due to microstructure will now be presented. Two quantities are required:

$$\Phi_2^{(p)}(r,\theta,\Theta)=r^2\Phi_0(r,\theta)\partial_\Theta^{-2}[V(r,\Theta)-V_{av}(r)] \tag{95}$$

and $$Q(r)=\frac{r^2}{2\pi}\int_0^{2\pi}|\partial_p^{-1}[V(r,p)-V_{av}(r)]|^2\,dp. \tag{96}$$

The mean-zero antiderivatives in equations (95) and (96) are explicitly calculable due to the form of the potential (78). For $r\in R_i$, $$\partial_\Theta^{-1}[V(r,\Theta)-V_{av}(r)]= \tag{97}$$
$$C_1-V_{av,i}\Theta+\sum_{j=1}^{M_i}1_{[\Theta_j,\Theta_{j+1}]}(\Theta)(S_j+V_{i,j}(\Theta-\Theta_j))$$

where $$S_j=\sum_{k=1}^{j-1}V_{i,k}(\Theta_{k+1}-\Theta_k) \tag{98}$$

and the constant $C_1$ is given below. Integrating again, once more for $r\in R_i$, $$\partial_\Theta^{-2}[V(r,\Theta)-V_{av}(r)]=C_2+C_1\Theta-\frac{1}{2}V_{av,i}\Theta^2+ \tag{99}$$
$$\sum_{j=1}^{M_i}1_{[\Theta_j,\Theta_{j+1}]}(\Theta)\left(T_j+S_j(\Theta-\Theta_j)+\frac{1}{2}V_{i,j}(\Theta-\Theta_j)^2\right)$$

where $$T_j=\sum_{k=1}^{j-1}\left(S_k(\Theta_{k+1}-\Theta_k)+\frac{1}{2}V_{i,k}(\Theta_{k+1}-\Theta_k)^2\right) \tag{100}$$

and the constants $C_1$ and $C_2$ are given by $$C_1 = \pi V_{av,i} - T_{M_i+1} \tag{101}$$

$$C_2 = -\pi C_1 + \frac{(2\pi)^2}{6} V_{av,i} - \frac{1}{2\pi}\sum_{j=1}^{M_i}(T_j(\Theta_{j+1}-\Theta_j)^2 +$$

$$\frac{1}{2}S_j\Big((\Theta_{j+1}-\Theta_j)^2 + \frac{1}{6}V_{i,j}(\Theta_{j+1}-\Theta_j)^3\Big).$$

Finally, for $r \in R_i$, the integral in equation (96) evaluates to $$\frac{1}{2\pi}\int_0^{2\pi}\left|\partial_p^{-1}[V(r,p) - V_{av}(r)]\right|^2 dp = C_1^2 + \frac{1}{\pi}C_1 T_{M_i+1} + \tag{102}$$

$$\frac{1}{2\pi}\sum_{j=1}^{M_i}\Big(S_j^2(\Theta_{j+1}-\Theta_j) + S_j(V_{i,j}-V_{av,i})(\Theta_{j+1}-\Theta_j)^2 +$$

$$\frac{1}{3}(V_{i,j}-V_{av,i})^2(\Theta_{j+1}-\Theta_j)^3\Big)$$

CONCLUSION

From the above, it is apparent that the technique disclosed herein provides a systematic homogenization expansion for microstructured cylindrical waveguides with transverse N-fold symmetry. The method of derivation and multiple scale analysis facilitates the removal of fast scales due to the rapid variations in the microstructure. Therefore, numerical implementation of the expansion does not encounter the intrinsic "stiffness" associated with problems having large separations of scales. The technique disclosed herein has further implemented the expansion for a number of sample structures and has computed the effective indexes of their leaky modes (scattering resonances). Of great importance are the imaginary parts of the effective indexes, which correspond to the leakage rates and result from a combination of propagation and tunneling losses. In contrast to the real parts of the effective indexes, these leakage rates are very sensitive to the geometry of the microstructure in the case of low index (air) holes.

What is claimed is:

1. A system for determining propagation characteristics of a photonic structure having a transverse N-fold symmetry, wherein N is an integer greater than zero, comprising:
   a numerical analyzer that employs a leading order systematic homogenization expansion having multiple scales to develop an angularly averaged indexed profile for said photonic structure; and
   a principal corrector, associated with said numerical analyzer, that employs details of said photonic structure and said homogenization expansion to obtain effective refractive indices of modes of said photonic structure.

2. The system as recited in claim 1 wherein said modes are bound modes and said numerical analyzer incorporates decaying boundary conditions at spatial infinity.

3. The system as recited in claim 1 wherein said modes are leaky, scattering or quasi-modes and said numerical analyzer incorporates outward-going radiation boundary conditions.

4. The system as recited in claim 1 wherein said photonic structure has a simple layered potential corresponding to a simple layered refractive index profile.

5. The system as recited in claim 1 wherein said photonic structure has an arbitrary geometry.

6. A method of determining propagation characteristics of a photonic structure having a transverse N-fold symmetry, wherein N is an integer greater than zero, comprising:
   employing a leading order systematic homogenization expansion having multiple scales to develop an angularly averaged indexed profile for said photonic structure; and
   employing details of said photonic structure and said homogenization expansion to obtain effective refractive indices of modes of said photonic structure.

7. The method as recited in claim 6 said modes are bound modes and said employing said leading order systematic homogenization expansion comprises incorporating decaying boundary conditions at spatial infinity.

8. The method as recited in claim 6 wherein said modes are leaky, scattering or quasi-modes and said employing said leading order systematic homogenization expansion comprises incorporating outward-going radiation boundary conditions.

9. The method as recited in claim 6 wherein said photonic structure has a simple layered potential corresponding to a simple layered refractive index profile.

10. The method as recited in claim 6 wherein said photonic structure has an arbitrary geometry.

11. A photonic structure designed by the method of claim 6.

12. A photonic structure designed by the method of claim 7.

13. A photonic structure designed by the method of claim 8.

14. A photonic structure designed by the method of claim 9.

15. A photonic structure designed by the method of claim 10.

* * * * *